United States Patent
Kimura et al.

[11] Patent Number: 5,978,561
[45] Date of Patent: *Nov. 2, 1999

[54] IMAGE FORMING APPARATUS

[75] Inventors: Shunichi Kimura; Akihiro Andoh; Setsu Kunitake; Shinji Shishido; Yutaka Koshi; Koh Kamizawa, all of Ashigarakami-gun, Japan

[73] Assignee: Fuji Xerox Co., Ltd., Tokyo, Japan

[ * ] Notice: This patent is subject to a terminal disclaimer.

[21] Appl. No.: 08/728,089

[22] Filed: Oct. 9, 1996

[30] Foreign Application Priority Data

Oct. 19, 1995 [JP] Japan ................................. 7-296155

[51] Int. Cl.$^6$ ........................... B41B 15/00; H04N 1/417; B41J 2/385
[52] U.S. Cl. ........................... 395/115; 395/115; 395/114; 347/116; 347/153; 358/261.2
[58] Field of Search .................................. 395/114, 115; 347/116, 153; 358/261.2

[56] References Cited

U.S. PATENT DOCUMENTS 5,274,461  12/1993  Mitsushashi ............................ 358/296
5,821,969  10/1998  Koshi et al. .......................... 358/261.2

FOREIGN PATENT DOCUMENTS 0 427 466 A2   5/1991   European Pat. Off. .
0 480 638 A2   4/1992   European Pat. Off. .

*Primary Examiner*—Edward L. Coles
*Assistant Examiner*—Twyler Lamb
*Attorney, Agent, or Firm*—Oliff & Berridge, PLC

[57] ABSTRACT

The memory capacity required for temporarily holding image data with respect to a printer is reduced, and loads involved in supplying image data, such as decoding and conversion processes, are dispersed and reduced. The apparatus divides image data in parallel with a main scanning direction by an image divider, stores the divided data in image data memory, and supplies the divided image data to image data temporary memory by an image data supply to perform a decoding process. In order to provide a matching with a process speed, the image data temporary memory temporarily retains the divided image data, and a printer prints an image on a sheet of paper on the basis of the divided image data stored in the image data temporary memory. A predictor predicts a supply process time by way of image data supply, and an image data supply control causes the image data supply to start the supply process of the divided image data at a time preceding the time for the start of the print process by the printer according to the time predicted.

33 Claims, 15 Drawing Sheets

MAIN SCANNING DIRECTION

FIG. 18 (A)
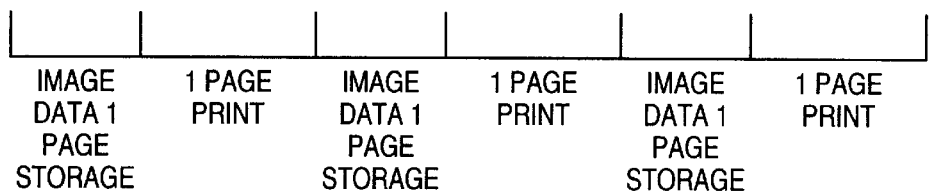
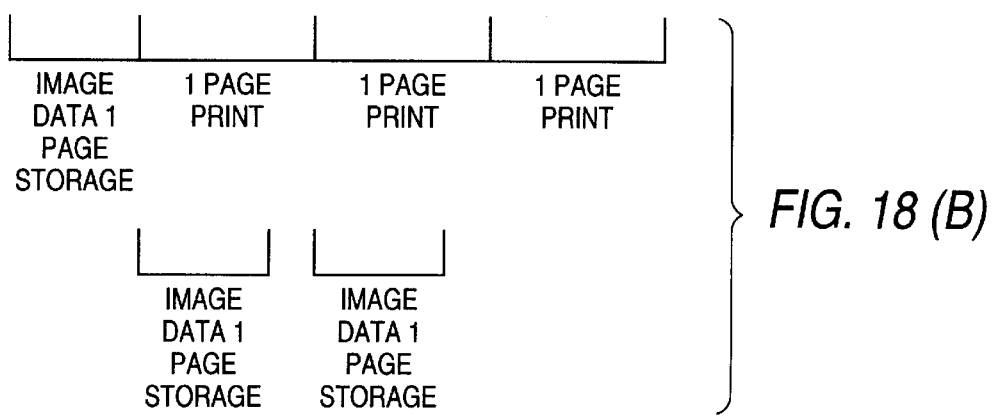
FIG. 18 (B)
FIG. 19
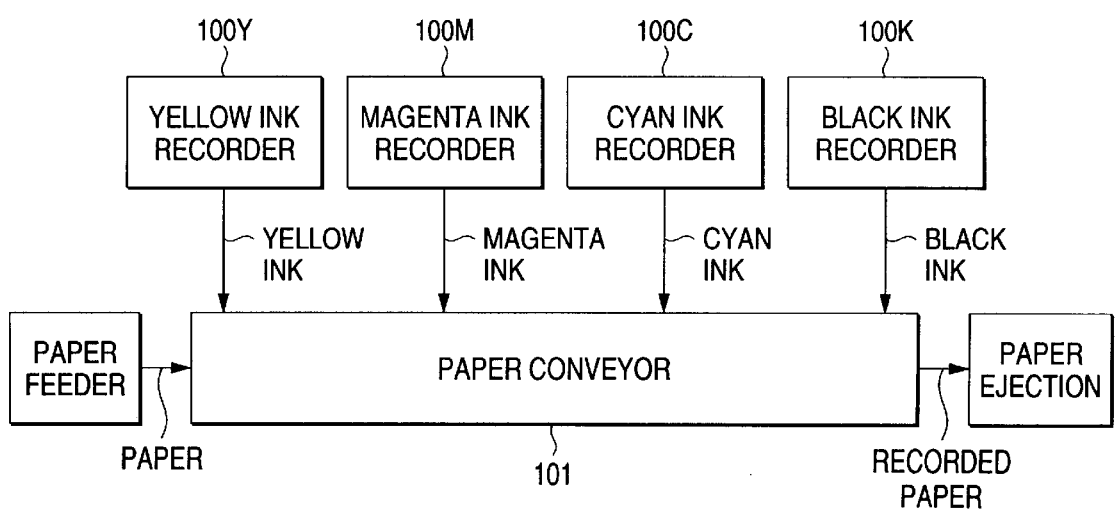

IMAGE FORMING APPARATUS

BACKGROUND OF THE INVENTION

1. Field of the Invention

The present invention relates to an image forming apparatus for dividing image data to printprocess the latter, and particularly to an image forming apparatus for controlling a supply of divided image data to print means.

2. Description of the Related Art

In an image forming apparatus such as an electronic photographic copier and a printer, an image formed on the basis of image data is printed on a sheet of paper by an electronic photographic process comprising a transfer process, a developing process, and a fixing process. Since a process speed of the electronic photographic process is constant, parameters of the processes constituting the electronic photographic process are designed on the basis of a predetermined process speed. For this reason, if the process speed is made variable, all the parameters of the processes concerned have to be made variable. This is not realistic.

As described above, in the image forming apparatus, the process speed is constant. Therefore, it is necessary to supply image data to print means (print engine) for forming an image from image data to print it on a sheet of paper at a constant speed according to the process speed. For example, in the case where the supply speed of image data to the print means is slower than the process speed, supply timing of paper to the print means is deviated from supply timing of image data, and as a result, a white sheet of paper not printed with an image is ejected or a disturbed image is printed on a sheet of paper halfway.

In the image forming apparatus, it is implemented that in communicating image data or in storing image data in memory means, image data is coded in order to reduce a quantity of data, and in printprocessing it, the image data is decoded. As described above, in the case where the image data is supplied in a coded state, the supply speed of image data to the print means depends on an original, since generally a speed for the coding process depends on an original, whereby matching of the supply timing of image data to the print means to the supply timing of a sheet of paper cannot be assured.

In the case where a coding system is a non-reversible coding system, control for a quantity of codes is made so that a constant quantity of codes is obtained per page whereby a decoding speed can be made constant. However, generally, there exist properties such that in the case where a certain image is non-reversible coded, the smaller the quantity of codes the larger the deterioration of image quality, and an image which is hard to be coded (for example, an image constituted at random noise) increases in deterioration of image quality in case of coding with the same quantity of codes as compared with a normal image (for example, a natural image such as a figure and a landscape). For this reason, in the case where a variety of images are coded with a constant quantity of codes by the control of a quantity of codes, the deterioration of image quality increases depending on images, sometimes failing to maintain an image which can withstand a practical use.

Accordingly, in the case where image data is coded and supplied, it is difficult to make the decoding speed constant, if an image is intended to be assured, making it difficult to supply image data to print means at a speed corresponding to the process speed.

In the case where it is difficult to make the decoding speed constant as described above, decoded image data is first retained in temporary memory means such as a buffer memory and the image data is supplied from the temporary memory means to the print means. Then, the supply of image data to the print means can be made at the speed corresponding to the process speed to prevent the situation such as ejection of white (unprinted) paper or printing of a disturbed image from occurring.

Therefore, in a conventional printing apparatus, a page memory (a semiconductor memory) capable of storing image data for one page portion or more is provided so that image data for one page portion or two-page portion are temporarily stored whereby image data are supplied to the print means according to the process speed.

For example, in the case where a page memory for one page portion is provided, as shown in FIG. 18A, image data for one page portion are stored in the page memory, after which a sheet of paper is fed from a paper feeder to the print means, and the print means prints images for one page portion on a sheet of paper fed on the basis of the image data stored in the page memory. The operation of the storage of image data, the feed of a sheet of paper and the printing of images is repeatedly implemented per page.

In the case where a page memory for a two-page portion is provided, as shown in FIG. 18B, the processing, in which while the printing process being is carried out on the basis of image data for one page portion stored in the page memory, image data for the next one page portion is stored in the page memory, is repeatedly implemented, thus enabling printing of a plurality of pages continuously.

In the case where the page memory for one page portion alone is provided as described above, the storage of image data and printing are sequentially carried out. Therefore, in the case where a plurality of sheets are continuously fed for printing, the through-put is lowered. On the other hand, in the case where the page memory for a two-page portion is provided, since the storage of image data and printing are carried out in parallel, the through-put is improved but a quantity of memory required for the page memory increases, resulting in an increase of cost.

The above-described things will apply to not only a monochromatic printer but also a color printer in which inks of color components, yellow (Y), magenta (M), cyan (C) and black (K), are placed upon one another and recorded.

In the color printer, as shown in FIG. 19, recorders (print means) exclusive-use for color components 100Y, 100M, 100C and 100K are provided, and these recorders 100Y, 100M, 100C and 100K are operated in pipeline adjusting to the process speed with respect to sheets of paper conveyed by a paper conveyor 101 to thereby enabling a through-put of color print close to that of monochromatic print.

In the pipeline color printer, the through-put is enhanced by subjecting sheets of paper to pipeline processing. Thus, when there is a vacancy in the pipeline (that is, sheets of paper cannot be passed continuously to the recorders for various colors), the through-put becomes lowered.

In the case where a plurality of the same originals are continuously printed, when image data for one page portion are prepared for the page memory for one page portion, sheets of paper are continuously fed to the pipeline, and the image data stored in the page memory are read plural times and supplied to the recorders 100Y, 100M, 100C and 100K plural times whereby images may be printed repeatedly on the plurality of sheets of paper fed.

On the other hand, in the case where a plurality of different originals are continuously printed, for example, a page memory for a portion of the number of sheets of originals is provided so that all the image data are prepared for the page memory, and after this, sheets of paper have to be fed to the pipeline. Because of this, when a page memory is constituted by a semiconductor memory, the greater part of printer cost is occupied by the cost of the semiconductor memory. Further, when a page memory is constituted by a magnetic disk, since a data transfer speed of the magnetic disk is greatly slower than a recording speed, a plurality of magnetic disks have to be operated in parallel. Thus, the greater part of printer cost is occupied by the cost of the magnetic disks.

That is, in the case where a plurality of different originals are continuously printed assuring the pipeline operation, a page memory (temporary memory means) for a depth portion, of a pipeline is necessary. The storage of image data to the page memory should have been completed before the supply of sheets of paper.

For example, in an example in which pages for different images are decoded with the time required for the recording by the recorders 100Y, 100M, 100C and 100K deviated, and the images are recorded sheet by sheet, the processing as shown in FIG. 20 is implemented. In this figure, the axis of abscissa indicates the time axis, in which below the timing at which a recording sheet of each page is processed the capacity of a page memory required at that time is shown by the memory capacity (1 plane) for one page and one color.

First, In the process for the first page, image data (four planes) for color components, yellow (Y), magenta (M), cyan (C) and black (K) are decoded and retained in the page memory. Then, paper feeding process for conveying recording sheets to the head position of a row of recorders is implemented, after which sheets of paper are conveyed between the recorders 100Y, 100M, 100C and 100K, and the recording processes are sequentially implemented on the basis of the image data of color components. As a result, after the time of 6 units, images for one page are recorded one upon another on sheets of paper for color components, and the data retaining capacity of the page memory with respect to one page is vacant "0."

In the state delayed by the time of one unit, the second page is processed in parallel, and in the state further delayed by the time of one unit, the third page is processed in parallel. In this manner, the capacity of the page memory which is necessary every completion of the recording process for one plane is reduced "1" by "1" and the pages are sequentially processed in parallel.

That is, in the above-described example, if the pipeline is filled after the time of 6 units from the start of printing and the page memory has the memory capacity for 18 planes at the maximum, different images can be recorded on the sheets of paper continuously fed.

In the case of the tandem type color printer as described above, data for a plurality of pages are retained in the page memory to enable the continuous feeding of recording sheets to carry out recording while preventing the throughput from being lowered.

Further, for example, in an image forming apparatus for handling image data of language described on the page, in carrying out the printing on sheets of paper, the data type of image data is sometimes processed to be converted, the things similar to the case of decoding process described above involve in the case where such conversion as described is carried out.

As described above, in the tandem type color printer, for example, in the case where a plurality of different images are printed, even if recording sheets of paper are intermittently fed, a page memory for a depth portion of a pipeline is necessary. In an example shown in FIG. 20, a page memory for 18 planes is necessary.

A page memory is constituted by a semiconductor memory which is high in access speed. Then, for example, in the case of image data having a resolution of JIS A4 format, 400 [dot/25.4 mm], and a gradation precision of each pixel 8 [bit/pixel], data quantity for one plane is about 16 [MByte]. Thus, a large capacity memory of about 288 [MByte] in total for 18 planes is necessary, resulting in a considerable increase in printer cost.

Also in a monochromatic printer, in order that data of different kinds of image pages are continuously printed, a memory having a capacity of about 32 [MByte] in total for two pages at the minimum is necessary, resulting in a considerable increase in printer cost caused by the memory cost.

Further, in the color printer, means for carrying out decoding and conversion process to supply image data to print means (recorders) are present independently every color component. Therefore, loads cannot be dispersed even in the case where the loads of supplying image data are one-sided every color component. Therefore, in the case where a load in respect of a color component is large, even if there is room in image data supply means for carrying out decoding and data conversion process as a whole, there sometimes occurred the things in which the print process by print means cannot be done.

SUMMARY OF THE INVENTION

The present invention has been accomplished in view of the above-described things encountered in prior art. An object of the present invention is to provide an image forming apparatus which reduces a memory capacity necessary for temporarily retaining image data in order to carry out a recording process without any inconvenience in print means.

A further object of the present invention is to provide an inexpensive image forming apparatus in which loads involved in a supplying process of image data such as decoding and conversion process of data types are dispersed whereby the loads of image data supply means are reduced to perform the quick process.

For achieving the above-described objects, an image forming apparatus according to the present invention divides an input image in parallel with a main scanning direction by image division means, stores said divided data in image data memory means, and supplies the divided image data from the image data memory means to image data temporary memory means by image data supply means for performing a decoding process or the like. In order to provide a matching with a process speed, the image data temporary memory means temporarily retains the divided image data, and print means prints an image on a sheet of paper on the basis of the divided image data stored in the image data temporary memory means.

Prediction means predicts a supply process time by way of image data supply means, and image data supply control means causes the image data supply means to start the supply process of the divided image data at a time preceding the time for the start of the print process by way of the print means according to the time predicted by image data supply control means. Thereby, the supply start time for the divided image data is controlled so that the supply of the image data to the print means is in time for the print process and the image data retained in the image data temporary memory means is not insufficient, whereby the divided image data can be continuously printed.

That is, the print process is started at the same time when the divided image data are retained in the image data memory means. The print process is started before the image data for one page portion is stored in the image data temporary memory means. In order that the time for supplying the divided image data to the print means (image data temporary memory means) is predicted to perform the supply process by way of the image data supply means, the divided image data is supplied at the appropriate time for the print process.

In the image forming apparatus according to the present invention, image division means divides a color image in parallel with a main scanning line and print means comprises a plurality of units for performing a print process with color ink corresponding to divided image data for every color component. The image data supply control means causes the image data supply means to start the supply process for the divided image data for color components at a time preceding the print process start time by way of the units of the print means whereby color image data divided in a pipeline color printer are continuously printed in a manner similar to that described above.

The image forming apparatus according to the present invention comprises a plurality of image data supply means, image data supply means selection means for selecting one out of said image data supply means used for a supply of the divided image data, and image data temporary memory means address selection means for determining an area address within the image data temporary memory means for storing the divided image data, to cause the image data supply means selected to transmit the divided image data from the image data memory means for a predetermined process and to transmit the divided image data from the image data supply means to the selected address area within the image data temporary memory means.

That is, the individual divided image data are processed by the image data supply means independently of other divided image data, and the supply start time for the divided image data, the image data supply means and the image data temporary memory means are controlled so that the supply of the divided image data to the print means is in time for the print process and the number of the image data supply means and the amount of the image data temporary memory means are not insufficient whereby the divided image data are continuously printed.

In the image forming apparatus according to the present invention, the image division means divides a color image in parallel with a main scanning line, the print means comprises a plurality of units for performing a printing process with color ink corresponding to the divided image data for every color component, and print means selection means is provided to select which print means is used for the print process. The image data supply control means causes the selected image data supply means to start the supply process for the divided image data for color components at a time preceding the print process start time by the selected unit of the print means according to the time predicted, whereby the divided color image data are continuously printed in a manner similar to that as described above.

The image forming apparatus according to the present invention further comprises a plurality of image data supply means, the same number of image data temporary memory means as that of the former, and image data temporary memory means selection means for selecting one of the image data temporary memory means used to supply the divided image data to the print means. The image data supply control means causes the selected image data supply means to supply and process individual divided image data independently of other divided image data according to the time predicted and fixedly retains the divided image data supplied from the image data supply means in the same image temporary memory means. The supply start time for the divided image data, the image data supply means and the image data temporary memory means are controlled so that the supply of the divided image data to the print means is in time for the print process and the number of the image supply means and the amount of the image data temporary memory means is not insufficient whereby the divided image data are continuously printed.

In the image forming apparatus according to the present invention, the image division means divides a color image in parallel with a main scanning line, the print means comprises a plurality of units for performing a printing process with color ink corresponding to the divided image data for every color component, and print means selection means is provided to select which print means is used for the print process. The image data supply control means causes the selected image data supply means to start the supply process for the divided image data for color components at a time preceding the print process start time by the selected unit of the print means according to the time predicted and to retain the supplied and processed divided image data in the selected image data temporary memory means whereby the divided color image data are continuously printed in a manner similar to that as described above.

The image forming apparatus according to the present invention further comprises feed paper control means for delaying a feed paper timing for a sheet of paper on the basis of the state where the divided image data to be printed is not yet stored in the image data temporary memory means wherein in the case where the print process cannot be made due to the fact that the number of image data supply means or the capacity of the image temporary memory means is insufficient, the print start time is delayed to enable the print process.

That is, the paper feed control means controls the paper feed start time adjusting to the print start time of a paper to thereby open the page subjected to the print process to render the print possible.

Further, in the image forming apparatus according to the present invention, the prediction means obtains the supply start time for the divided image data retroactive in time from the print start time of the last divided image data of the page to be printed finally prior to the print process by the print means and the image data supply control means calculates the number of the image data supply means and the capacity of the image data temporary memory means every time unit to examine the print possibility. In the case where print is impossible, the print start time of the page is delayed to render the print possible.

That is, the decoding start time is determined so as to be in time for the print start time of the divided image data to be printed finally of the last page, and the second decoding start time from the last is determined so as to be in time for the print start time of the second image data from the last. In this case, in the case where the capacity or the number of the decoding means or the image data temporary memory means are insufficient, the second decoding start time from the last is quickened till the capacity and the number of the decoding means and the image data temporary memory means are not insufficient. The thereafter decoding start time for the divided image data is likewise determined. In the case where the capacity and the number of the decoding means or the image data temporary memory means are insufficient, the print start time for a next page is delayed.

In the image forming apparatus according to the present invention, the image data memory means comprises coding means for information source coding image data and coded data memory means for storing coded data, and the image data supply means comprises image decoding means for decoding coded data, whereby the divided image data are information source coded and stored, and when the divided image data are supplied, the coded data are decoded and supplied.

That is, since the input image data is divided and coded, they can be independently decoded by image data supply means, and the divided image data can be decoded in parallel. Further, the order for starting decoding can be changed. Therefore, it is possible to decode the divided image data at time intervals which can most effectively make use of the number of image decoding means (decoders) given in advance and the capacity of the image data temporary memory means. Further, since the decoding time is known in advance by the prediction means, it is possible to obtain the decoding start time of most effective image data. The print process can be performed without the need of storage of image data for one page portion.

Further, in the image forming apparatus according to the present invention, the prediction means predicts the decoding time by using the quantity of codes of the divided coded image data.

Further, in the image forming apparatus according to the present invention, the prediction means predicts the decoding time by using the process speed by way of the coding means.

Further, in the image forming apparatus according to the present invention, the prediction means predicts the decoding time by using the number of coded symbols of the divided image data. The number of coded symbols herein termed is, in a high efficiency coding system combined with an entropy coding system, the number of symbols for the object for the entropy coding after reduction in redundancy. For example, this indicates the number of symbols for the object for Houghman coding in a JPEG system of ITU-T standards.

Furthermore, in the image forming apparatus according to the present invention, the prediction means measures the decoding time obtained when the decoding process is performed in advance by the image decoding means instead of the prediction of the decoding time.

BRIEF DESCRIPTION OF THE DRAWINGS

FIG. 18(A) and FIG. 18(B) is an explanatory view showing a relationship between the decoding time and the print time in prior art;

FIG. 19 is a constitutional view showing one example of a conventional image forming apparatus.

DESCRIPTION OF THE PREFERRED EMBODIMENTS

An image forming apparatus according to the present invention will be described hereinafter by way of embodiments.

Figure 1:
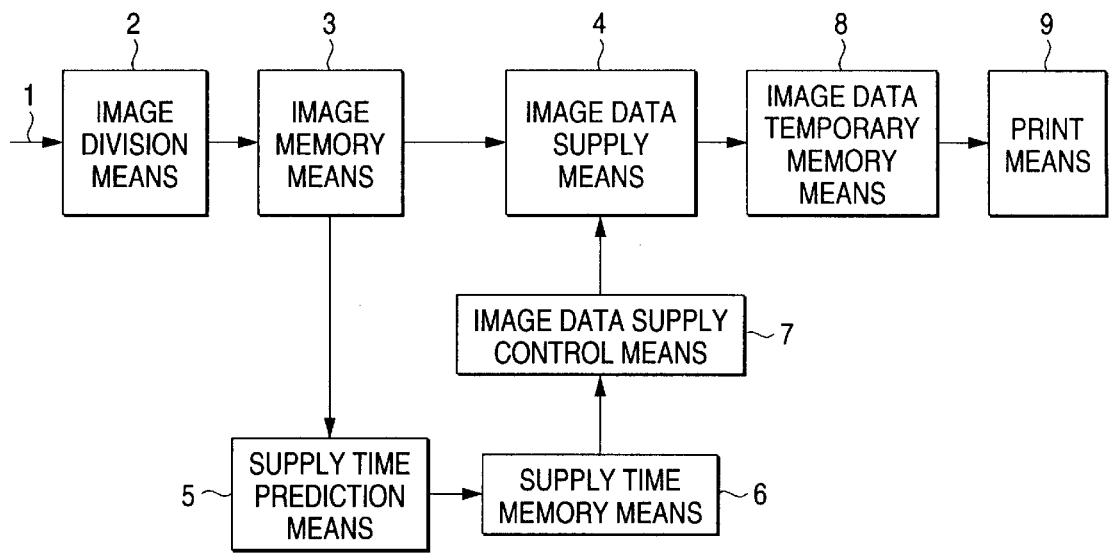
FIG. 1 is a constitutional view of an image forming apparatus according to a first embodiment of the present invention.

FIG. 1 is a constitutional view of an image forming apparatus according to a first embodiment of the present invention. The image forming apparatus comprises image division means 2 for dividing input image data 1 in a direction of a main scanning line, image memory means 3 for storing the divided image data, image data supply means 4 for removing the divided image data from the image memory means 3 to perform a predetermined supply process, supply time prediction means 5 for predicting the time necessary for the image data supply means 4 to supply and process the divided image data, supply time memory means 6 for storing the time predicated by the supply time prediction means 5, image data supply control means 7 for controlling the start time of the supply and process by the image data supply means 4, image data temporary memory means 8 for temporarily storing the divided image data supplied from the image data supply means 4, and print means 9 for printing an image on a sheet of paper on the basis of the image data temporarily stored in the image data temporary memory means 8.

Figure 2:
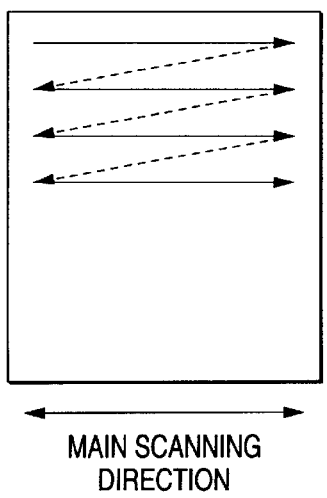
FIG. 2(A) and FIG. 2(B) is a conceptual view explaining the division of image data.
Figure 2:
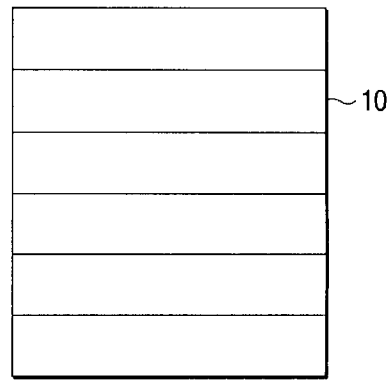

In the present embodiment, the input image data 1 is monochromatic image data. This image data is continuously input in one-dimension in a direction of a main scanning line as shown in FIG. 2A. The image division means 2 divides the image data in a direction of a main scanning line as shown in FIG. 2B into a plurality of divided image data 10, each divided image data 10 being stored in the image memory means 3.

The image data supply means 4 decodes the divided image data being coded in the supply processing, and the supply time prediction means 5 predicts the time required for the decoding process by the image data supply means 4 on the basis of the quantity of codes and the number of coded symbols of the divided image data being stored in the image memory means 3. The supply time memory means 6 records the supply time predicted by the prediction means 5, and the image data supply control means 7 causes the image data supply means 4 to start the supply processing of the divided image from the time preceding to the print process start time by the print means 9, according to the supply time stored in the memory means 6.

Figure 3:
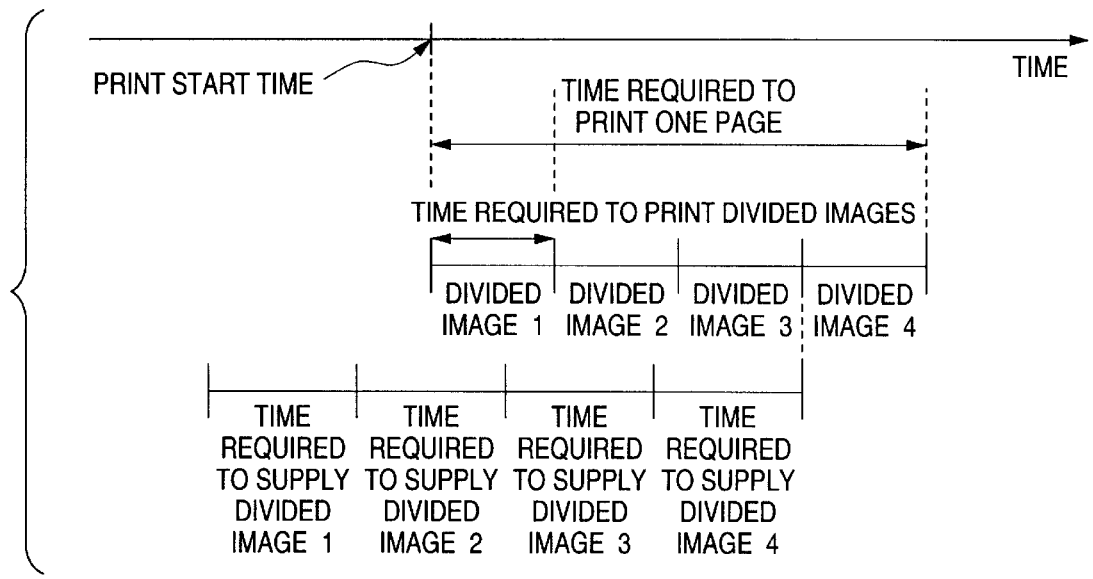
FIG. 3 is a time chart explaining the process according to the first embodiment of the present invention.

The print processing by the image forming apparatus constructed as described above is carried out in the procedure shown in FIG. 3. The present embodiment shows the case where image data for one page portion is divided into four divided image data by the image division means 2. These divided images 1–4 are subjected to the print processing in order as shown in the figure.

In order to print the divided image data 1–4 by the print means 9, it is necessary that prior to the start of the print by the print means 9, the divided image data 1–4 are stored in the image data temporary memory means 8. To this end, the image data supply control means 7 arithmetically calculates how long before the print start time by the print means 9 should the image data supply means 4 start the supply processing, on the basis of the prediction time stored in the supply time memory means 6, and causes the image data supply means 4 to start the supply processing on the basis of the calculated results to store the divided image data 1–4 in the image data temporary memory means 8.

As the result, the divided image data 1–4 are prepared for the image data temporary memory means 8 prior to start the printing by the print means 9, and the image based on the divided image data 1–4 are continuously printed on sheets of paper being supplied by the print means 9.

As described above, in the present embodiment, the image data temporary memory means 8 for storing all the image data for one page portion is not required by dividing and processing the image data, and the divided image data can be supplied to the print means 9 so that the printing can be done without trouble by predicting the time required for supplying and processing (decoding processing) the divided image data.

Figure 4:
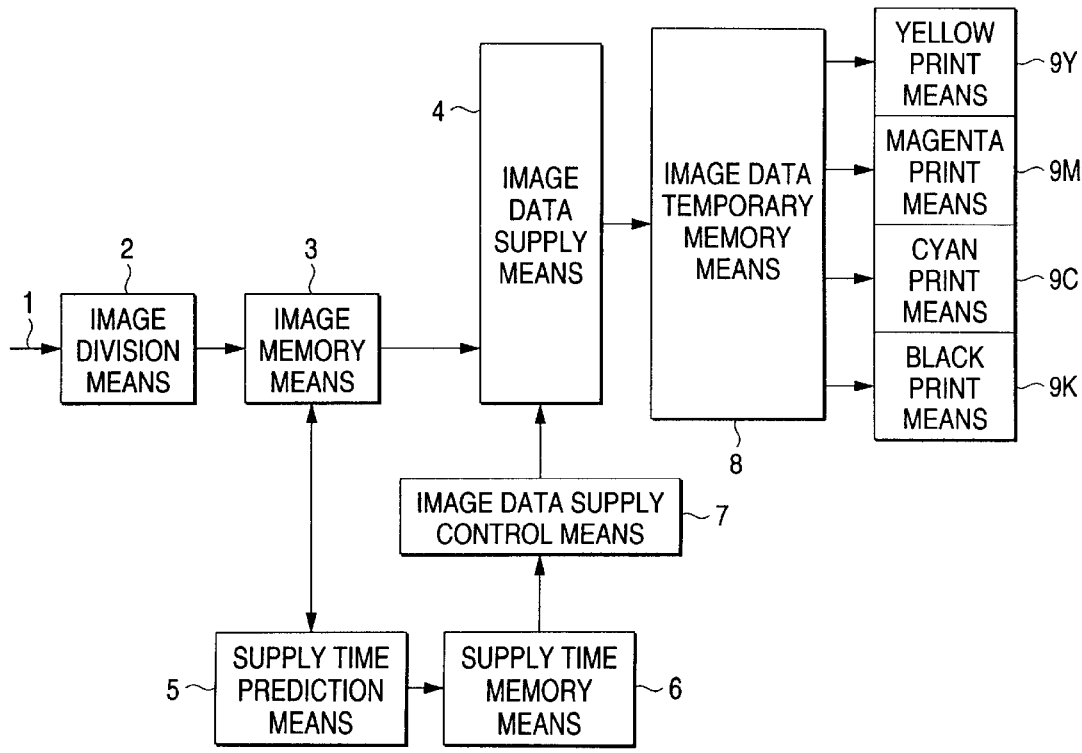
FIG. 4 is a constitutional view of an image forming apparatus according to a second embodiment of the present invention.

FIG. 4 is a constitutional view of an image forming apparatus according to a second embodiment of the present invention. The same parts as those in the above-described first embodiment are indicated by the same reference numerals, and a duplicated description is omitted.

The image forming apparatus according to the present invention is a pipeline color printer for printing a color image on a sheet of paper on the basis of color image data. The print means comprises yellow ink color print means 9Y for printing yellow ink, magenta ink print means 9M for printing magenta ink, cyan ink print means 9C for printing cyan ink, and black ink print means 9K for printing black ink.

The image division means 2 divides color image data 1 for one page portion in parallel in a direction of a main scanning line, and divides each divided image data every color component of yellow (Y), magenta (M), cyan (C) and black (K). With this, the image memory means 3 stores the image data every divided image data of each color component, and the image data supply means 4 supplies and processes the divided image data of each color component to store them in the image data temporary memory means 8. The supply time prediction means 5 predicts the time required for the image data supply means 4 to supply and process every divided image data of each color component, and the supply time memory means 6 stores the time predicted before every divided image data of each color component.

The image data supply control means 7 controls a supply of the divided image data for every color component by the image data supply means 4 so that the yellow print means 9Y performs the print processing corresponding to the yellow divided image data from the image data temporary memory means 8, the magenta print means 9M performs the print processing corresponding to the magenta divided image data from the image data temporary memory means 8, the cyan print means 9C performs the print processing corresponding to the cyan divided image data from the image data temporary memory means 8, the black print means 9M performs the print processing corresponding to the black divided image data from the image data temporary memory means 8.

Figure 5:
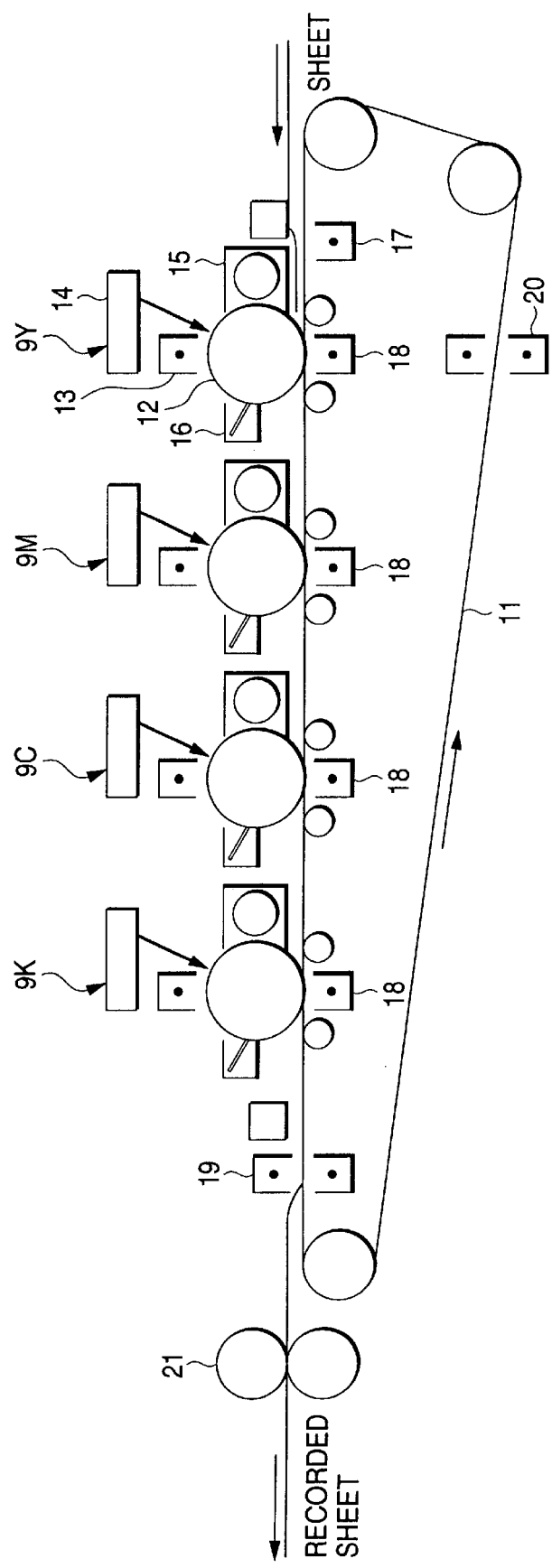
FIG. 5 is a constitutional view of a pipeline color printer to which the present invention is applied.

The image forming apparatus according to the present embodiment is realized as a tandem type color printer as shown in FIG. 5.

That is, in this apparatus, toner images for every color component are formed by four print means unit 9Y, 9M, 9C and 9K corresponding to colors of yellow (Y), magenta (M), cyan (C) and black (K), and the thus formed toner images are sequentially transferred to sheets of paper being conveyed by a sheet conveying device 11 of a transfer conveying belt system to form color images.

Each of the print means units 9Y, 9M, 9C and 9K comprises a charger 13, a laser scanning unit 14, a developing unit 15 and a cleaner 16 which are arranged in the periphery of a photosensitive drum 12. Toner images for every color component are formed on the photosensitive drum 12 via the steps of charging, exposure and development, and the toner images are electrostatically transferred to recording sheets carried on the sheet conveying device 11.

The sheet conveying device 11 has a transfer conveying belt extended over a plurality of rolls including a drive roll. In the vicinity of the transfer conveying belt are disposed a charger 17 for electrostatically adsorbing a recording sheet being fed from a supply tray not shown on the surface of the belt, a transfer corotron 18 for electrostatically transferring a toner image formed on each of the print means units 9Y, 9M, 9C and 9K to a recording sheet, an antistatic corotron 19 for eliminating electricity from the recording sheet electrostatically adsorbed on the belt, and an antistatic corotron 20 for eliminating electricity from the belt after the recording sheet has been stripped off.

Accordingly, when a recording sheet is conveyed while being adsorbed on the transfer conveying belt 8, the divided image data for every color are supplied from the image data temporary memory means 8 to the laser scanning unit 14 of each of the print means units 9Y, 9M, 9C and 9K so that in each of the print means units 9Y, 9M, 9C and 9K, toner images every color component is formed on the photosensitive drum. These toner images are sequentially transferred to the recording sheets being conveyed to form a color image in which toner images of color components are placed one upon another on the recording sheet. Thereafter, the recording sheet stripped off from the transfer conveying belt 11 is ejected to an ejection tray not shown via a fixing unit 21.

As described above, in the present embodiment, the image data temporary memory means 8 for storing all the image data for one page portion is not required by dividing and processing the image data, and the divided image data of color components can be supplied to the print means 9Y, 9M, 9C and 9K so that the printing can be done without trouble by predicting the time required for supply and processing (decoding processing) the divided image data of color components.

Figure 6:
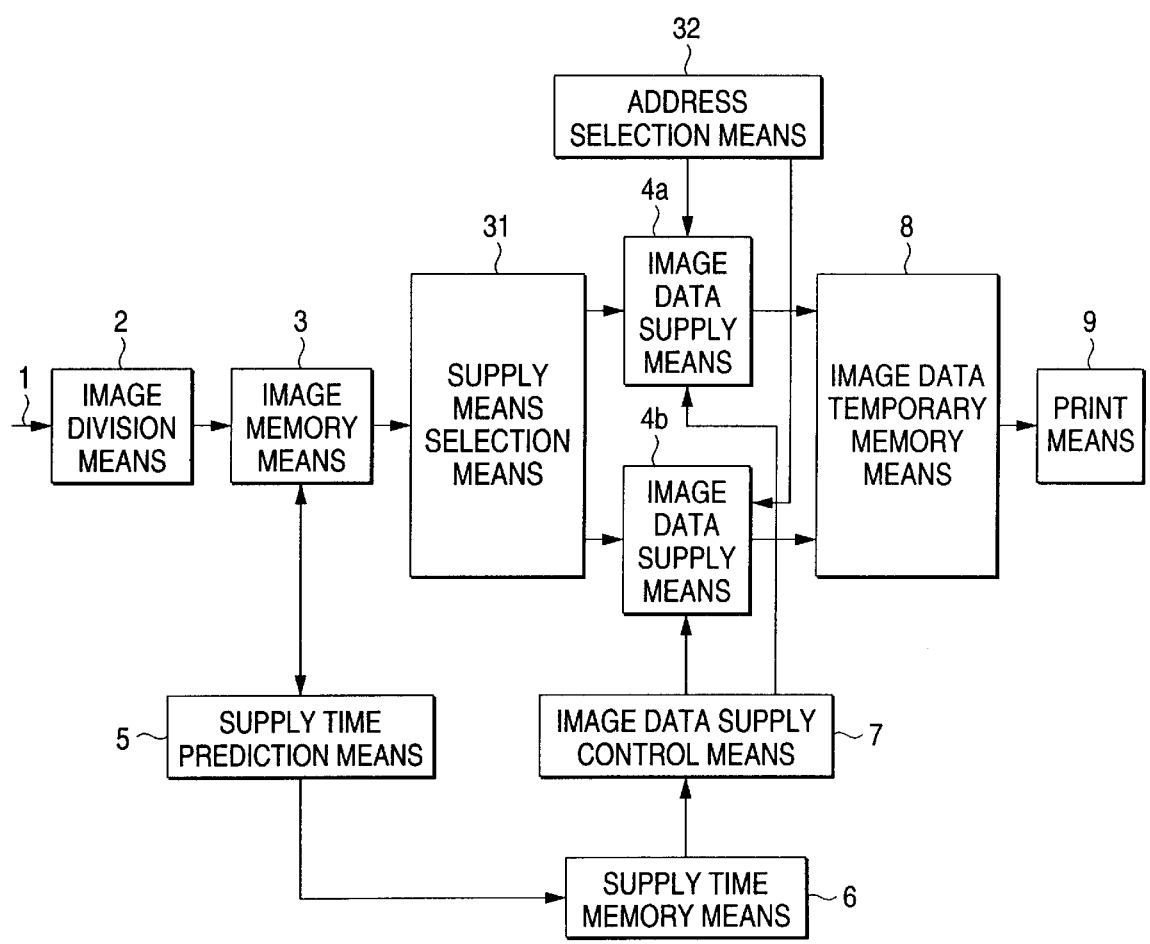
FIG. 6 is a constitutional view of an image forming apparatus according to a third embodiment of the present invention.

FIG. 6 is a constitutional view of an image forming apparatus according to a third embodiment of the present invention. The same parts as those in the above-described first embodiment are indicated by the same reference numerals, and a duplicated description is omitted.

The image forming apparatus according to the present invention is a printer for printing an image on a sheet of paper on the basis of monochromatic image data, which is provided with two image data supply means 4a and 4b.

The image forming apparatus according to the present embodiment comprises, in addition to the constitution of the first embodiment, image data supply means selection means 31 for selecting image data supply means for supplying and processing divided image data out of the two image data supply means 4a and 4b, and address selection means 32 for designating an address within the image data temporary memory means for storing the divided image data.

In the image forming apparatus according to the present embodiment, the image storage means 3 stores divided image data in a manner capable of supplying independently of other divided image data, and the image data supply means selection means 31 for selecting one out of the image data supply means 4a and 4b which is not at present being subjected to supplying and processing to transmit the divided image data from the image memory means 3.

The address selection means 32 designates a memory area address within the image data temporary memory means 8 so as to reserve the order of supplying the divided image data divided into the image data supply means 4a and the image data supply means 4b whereby the divided image data are stored in the image data temporary memory means 8 while holding the order. Further, the print means 9 performs printing corresponding to the order of the divided image data within the image data temporary memory means 8 to print and reproduce an original image on a sheet of paper.

As described above, in the present embodiment, the image data temporary memory means 8 for storing all the image data for one page portion is not required by dividing and processing the image data, and a plurality of image data supply means 4 for supplying and processing (decoding processing) divided image data is provided to disperse loads and speed up the supply and processing speed. Further, the time required for processing the image data supply means 4a and 4b is predicted in a manner similar to that previously mentioned whereby the divided image data can be supplied to the print means 9 so as to perform the print processing without trouble.

Figure 7:
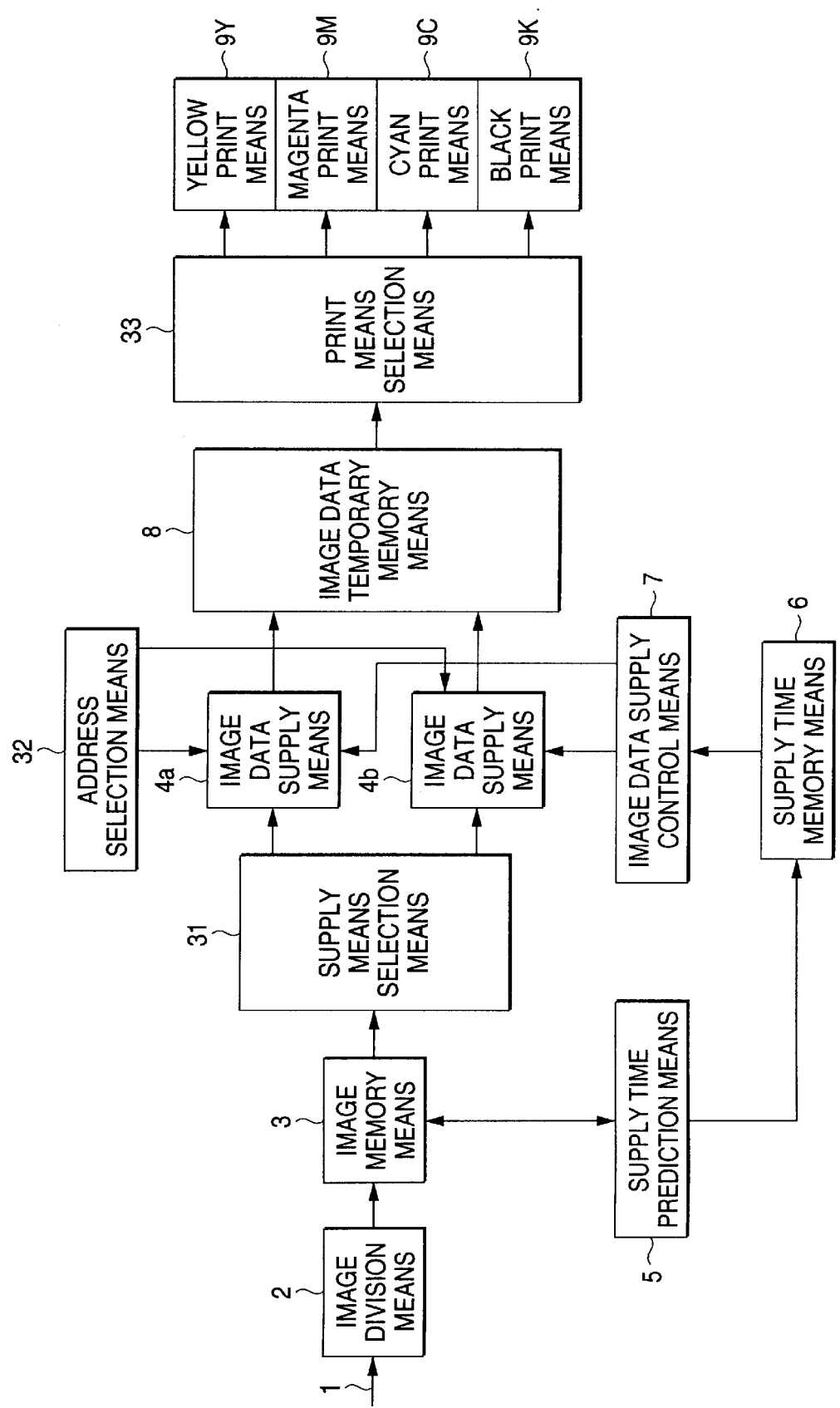
FIG. 7 is a constitutional view of an image forming apparatus according to a fourth embodiment of the present invention.

FIG. 7 is a constitutional view of an image forming apparatus according to a fourth embodiment of the present invention. The same parts as those in the above-described first embodiment are indicated by the same reference numerals, and a duplicated description is omitted.

The image forming apparatus according to the present invention is a pipeline color printer for printing a color image on a sheet of paper on the basis of color image data input, which is provided with print means selection means 33 for selecting print means used for print processing according to color components of divided image data out of yellow ink print means 9Y, magenta ink print means 9M, cyan print means 9C and black ink print means 9K.

As described above, in the present embodiment, the image data temporary memory means 8 for storing all the image data for one page portion is not required by dividing and processing the image data, and a plurality of image data supplying means 4 for supply- and processing (decoding processing) divided image data is provided to disperse loads and speed up the supply and processing speed. Further, the time required for processing the image data supply means 4a and 4b is predicted in a manner similar to that previously mentioned and print means according to color components of divided images is selected whereby the divided image data can be supplied to the print means so as to perform the print processing without trouble of color images.

Figure 8:
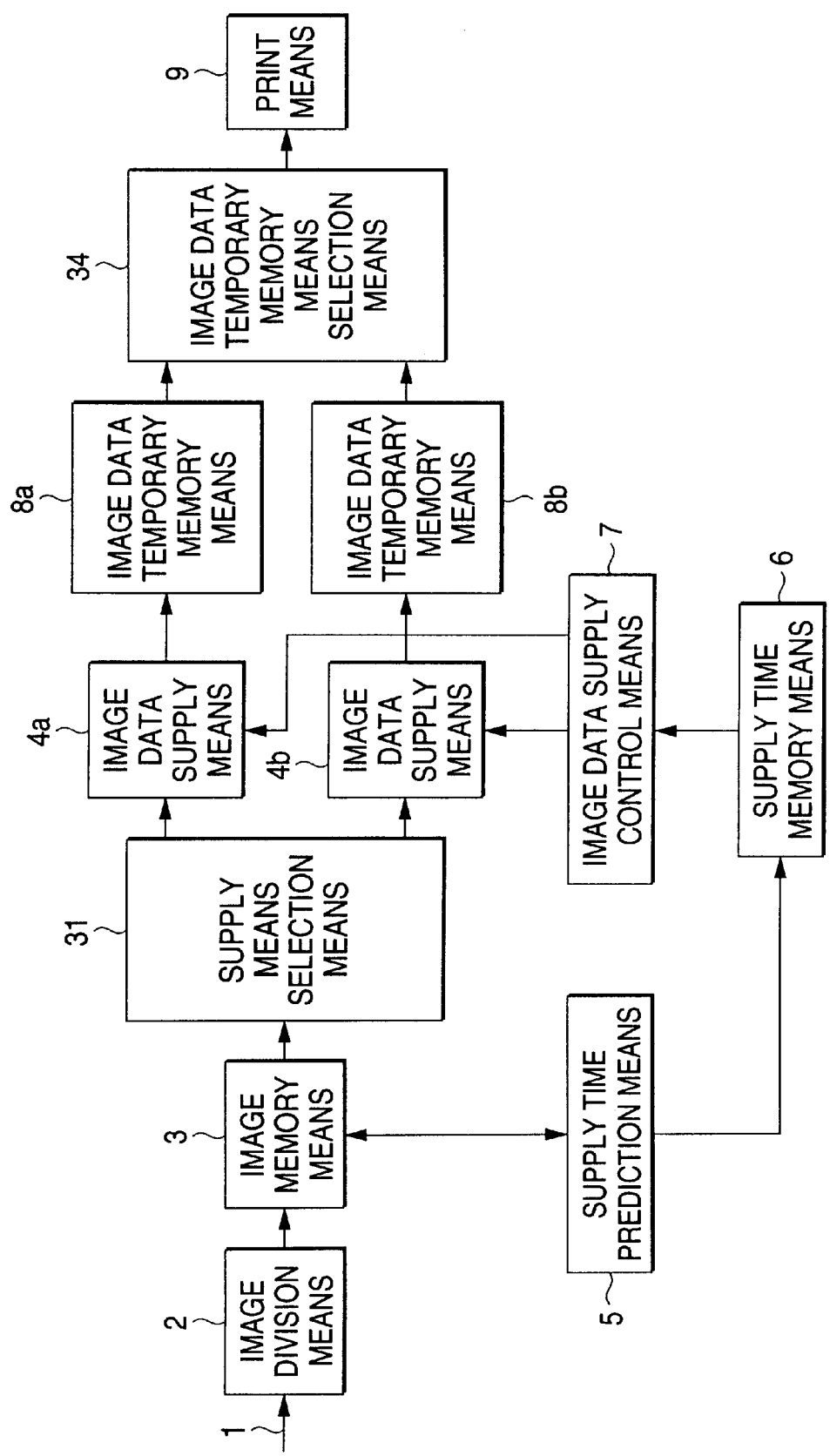
FIG. 8 is a constitutional view of an image forming apparatus according to a fifth embodiment of the present invention.

FIG. 8 is a constitutional view of an image forming apparatus according to a fifth embodiment of the present invention. The same parts as those in the above-described third embodiment are indicated by the same reference numerals, and a duplicated description is omitted.

The image forming apparatus according to the present invention is a printer for printing an image on a sheet of paper on the basis of monochromatic image data input, which is provided with image data supply means selection means 31 for selecting image data supply means for supplying and processing divided image data out of two image data supply means 4a, 4b and in addition, selection means 34 for selecting image data temporary memory means used for storing divided image data out of two image data temporary memory means 8a, 8b.

In the above-described third embodiment, an area of a single image data memory means is designated an address to temporarily store divided image data supplied from a plurality of image data supply means 4a, 4b in the order. On the other hand, in the present embodiment, adequate image data memory means is selected out of a plurality of image data temporary memory means 8a or 8b so that a plurality of image data temporary memory means 8a, 8b is made to correspond to a plurality of image data supply means 4a, 4b at a ratio of 1 to 1, and the order of an original image is reserved by the image data temporary memory means selection means 34, whereby the print means 9 prints and reproduces an original image in the order on the basis of the divided image data supplied from the plurality of image data supply means 4a, 4b.

As described above, in the present embodiment, the image data temporary memory means 8 for storing all the image data for one page portion is not required by dividing and processing the image data, and a plurality of image data supply means 4 for supplying and processing (decoding processing) divided image data is provided to disperse loads and speed up the supply and processing speed. Further, the time required for processing the image data supply means 4a, and 4b is predicted in a manner similar to that previously mentioned and image data temporary memory means is selected whereby the divided image data can be supplied to the print means 9 so as to perform the print processing without trouble.

Figure 9:
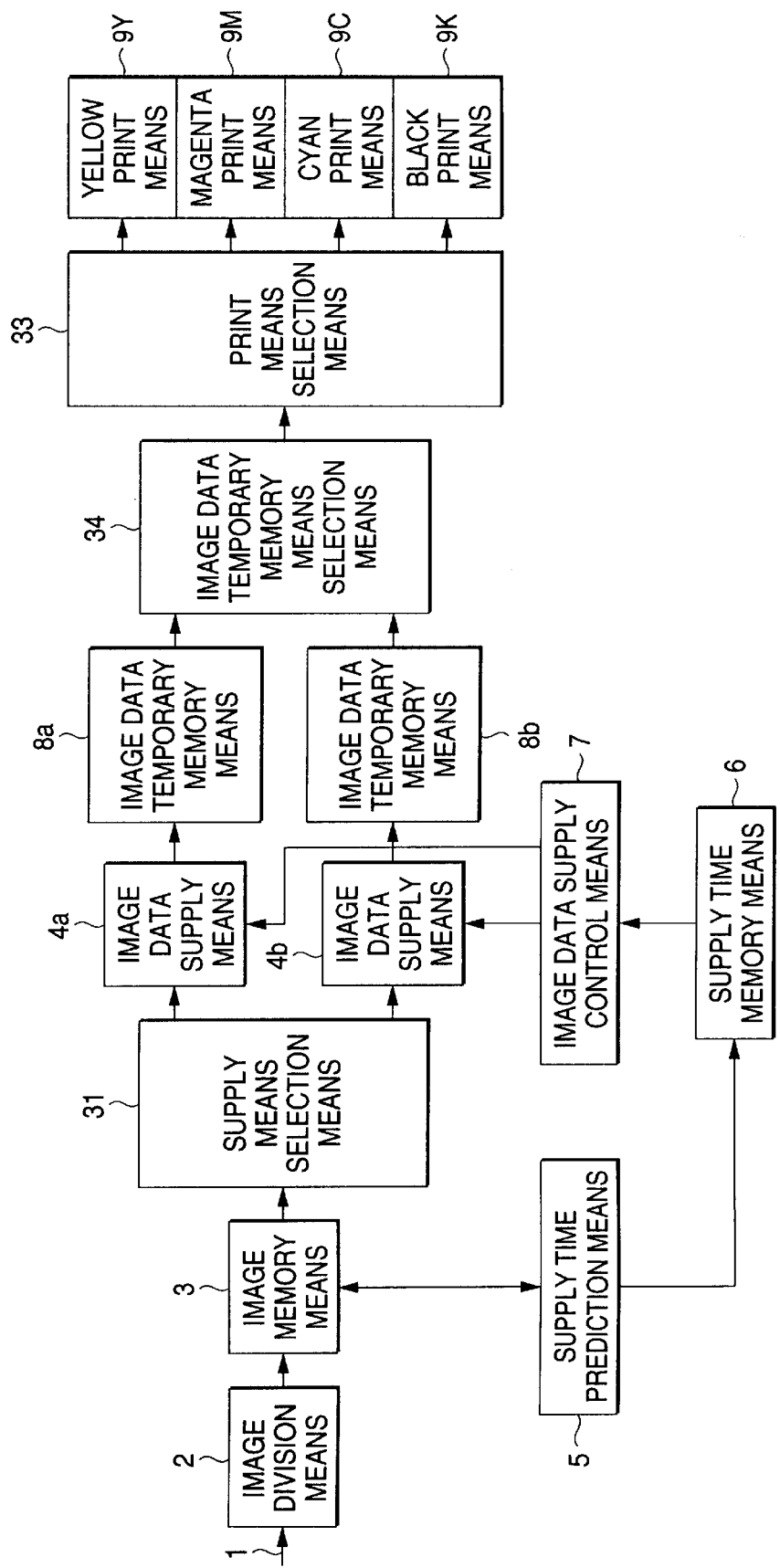
FIG. 9 is a constitutional view of an image forming apparatus according to a sixth embodiment of the present invention.

FIG. 9 is a constitutional view of an image forming apparatus according to a sixth embodiment of the present invention. The same parts as those in the above-described fourth and fifth embodiments are indicated by the same reference numerals, and a duplicated description is omitted.

The image forming apparatus according to the present invention is a pipeline color printer for printing a color image on a sheet of paper on the basis of color image data input, which is provided, in addition to the constitution of the fifth embodiment, with print means selection means 33 for selecting yellow ink print means 9Y, magenta ink print means 9M, cyan print means 9C and black ink print means 9K, and print means used for print processing according to color components of divided image data out of the print means 9Y, 9M, 9C and 9K.

In the present embodiment, image data temporary memory means 8a, 8b are selected by the image data temporary memory means selection means 34 so as to reserve the order of the divided image data every color component, and print means 9Y, 9M, 9C and 9K are selected by the print means selection means 33 so as to perform printing on the basis of adequate divided image data of color components.

Figure 10:
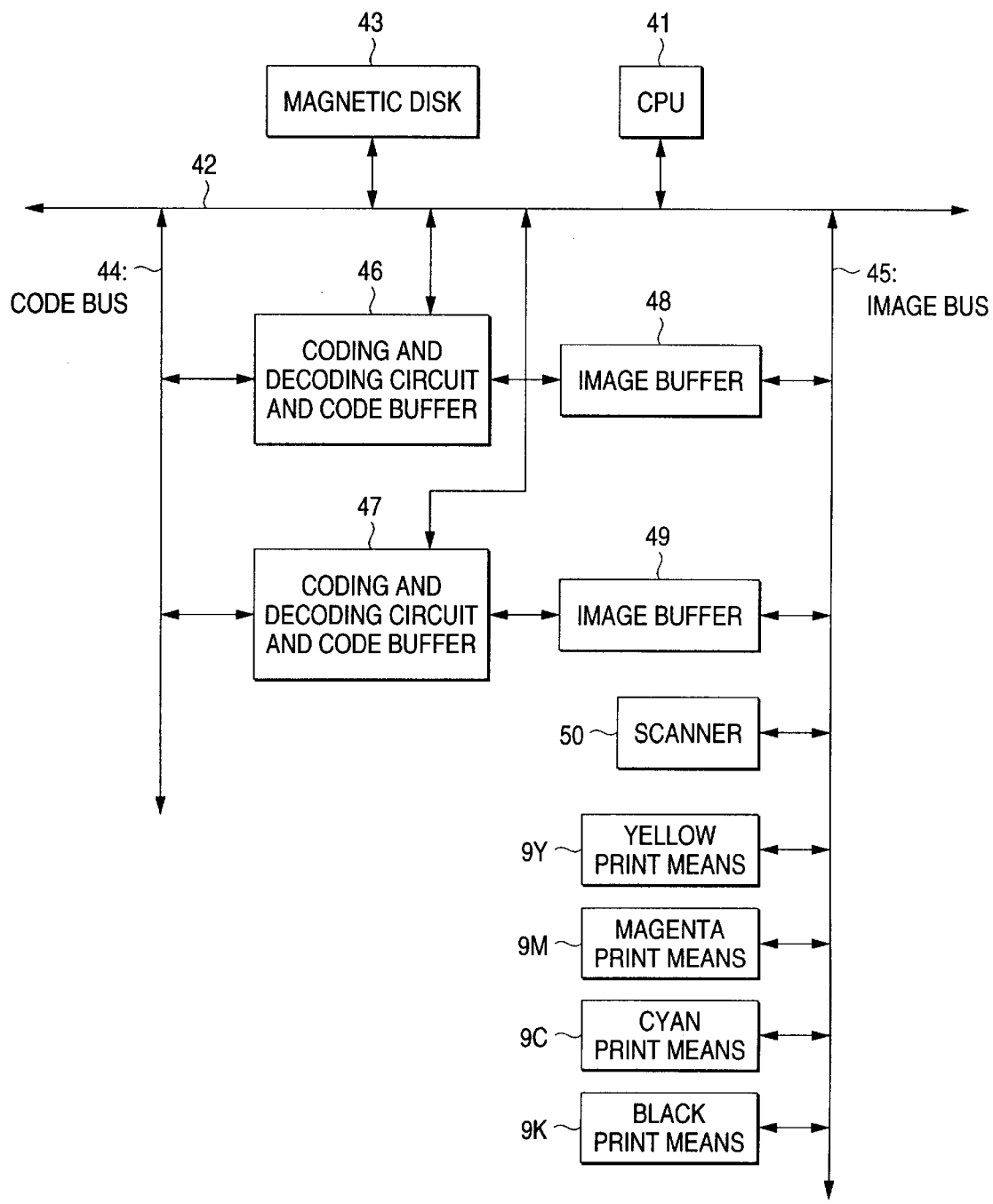
FIG. 10 is a view showing a more concrete constitutional example of the sixth embodiment according to the present invention.

An example of constitution according to the image forming apparatus of the present embodiment is further concretely shown in FIG. 10. The image data memory means 3 according to the present embodiment comprises coding means for information-source coding image data, and coded data memory means (coding buffer) for storing coded image data. The image data supply means 4a, 4b of the present embodiment has image decoding means for decoding coded image data.

In FIG. 10, reference numeral 41 designates a CPU for performing control; 42 a CPU bus; 43 a magnetic disk; 44 a code bus for transmitting code data; 45 an image bus for transmitting image data; 46 and 47 coding and decoding circuit and code buffer; 48 and 49 image buffers; 50 a scanner device; 9Y a yellow print device; 9M a magenta print device; 9C a cyan print device; and 9K a black print device.

Image division means 2 and supply time prediction means 5 are realized by a software activated by the CPU 41, and image data supply control means 7 is realized by using the soft ware and the code bus 44. Further, code data memory means of image data memory means 3 and supply time memory means 6 are realized by the magnetic disk 43, and coding means of the image data memory means 3 is realized by the coding and decoding circuit and the code buffers 46 and 47. Image data temporary memory means 8a and 8b are realized by the image buffers 48 and 49, and the image data supply means selection means 31 is realized by the software activated by the CPU 41 and the code bus 44. The image data temporary memory selection means 34 and the print means selection means 33 are realized by the software and the image bus 45.

In the image forming apparatus constructed as described above, the image data 1 input is divided from the scanner device 50 and taken in, and thence input into the image buffer 48 or 49. When a predetermined amount of image data is stored in the image buffers 48 and 49, the CPU 41 causes the coding and decoding circuit and the code buffers 46 and 47 to start to code the image data, independently coding the divided image data sequentially and storing them in the magnetic disk 43.

In the print processing, the code data (divided image data) stored in the magnetic disk 43 is input in the coding and decoding circuit and the code buffer 46 or 47 using the code bus 44, and the code data is decoded. In the decoding process, the same algorithm as the coded algorithm is used, and for example, a JPEG system of ITU-T standard is used as the coding and decoding algorithm.

The decoded divided image data are transferred to the image data temporary memory means 8a or 8b by designating a transfer source and a transfer destination by the image bus 45 so that the order of images is preserved and the data are transferred to the adequate print devices 9Y, 9M, 9C and 9K of color components, and then subjected to print processing by the adequate print devices 9Y, 9M, 9C and 9K.

Figure 11:
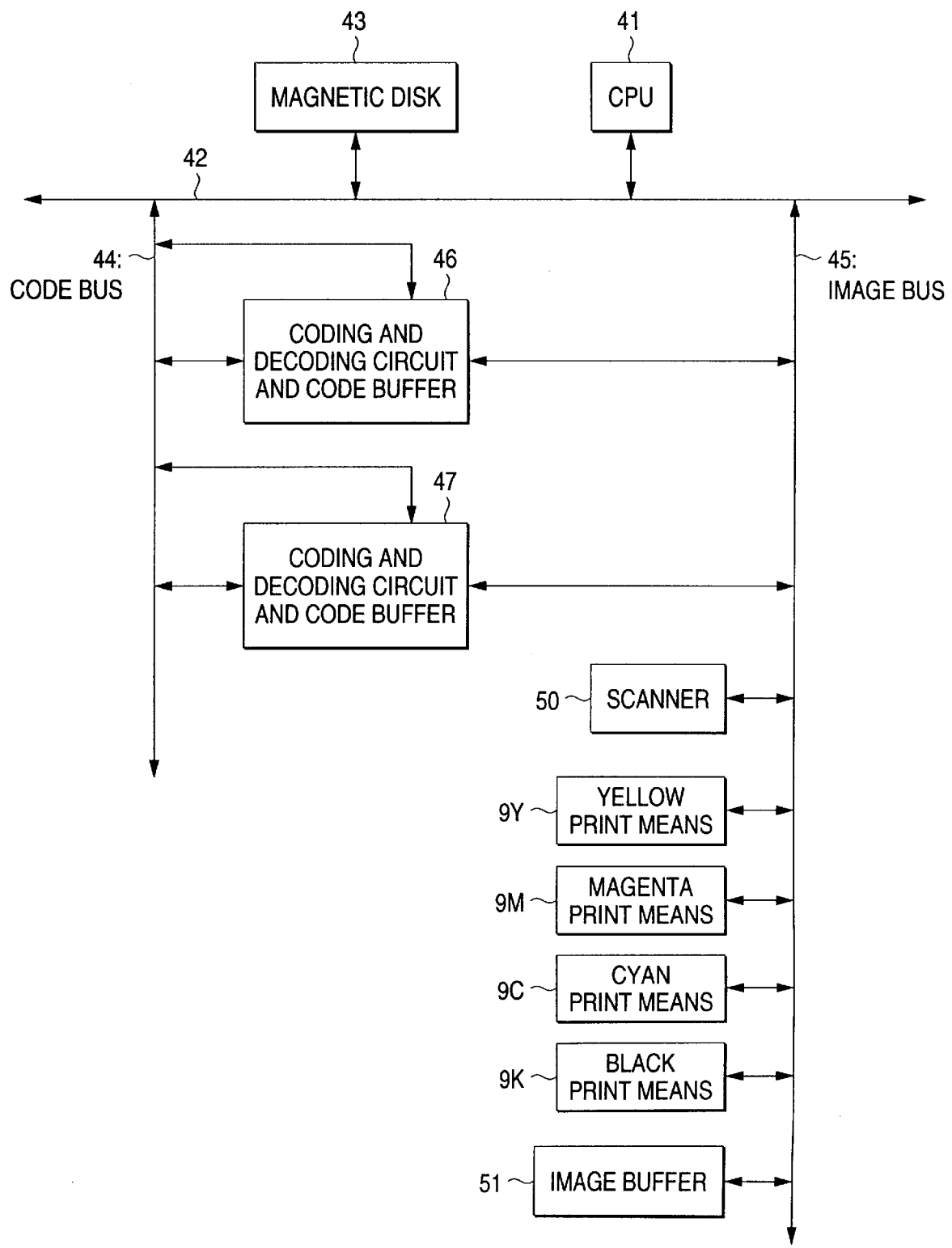
FIG. 11 is a view showing another concrete constitutional example of the sixth embodiment according to the present invention.

FIG. 11 is a view showing another concrete constitutional example of the sixth embodiment according to the present invention.

In the present constitutional example, an image buffer 51 is used in place of the image buffers 48 and 49 in the constitutional example shown in FIG. 10. In the present constitutional example, the image data temporary memory means selection means 34 and the print means selection means 33 are realized by the software activated by the image bus 45 and the CPU 41.

In the present constitutional example, since only one image buffer 51 is provided, all the divided image data supplied from the coding and decoding circuit and the code buffer 46 or 47 are input in the image buffer 57. For this reason, in which address area of the image buffer 57 data is held and from which address area of the image buffer 51 to which print device 9Y, 9M, 9C or 9K the divided image data is output are controlled by the CPU 41 and the image bus 45.

Figure 12:
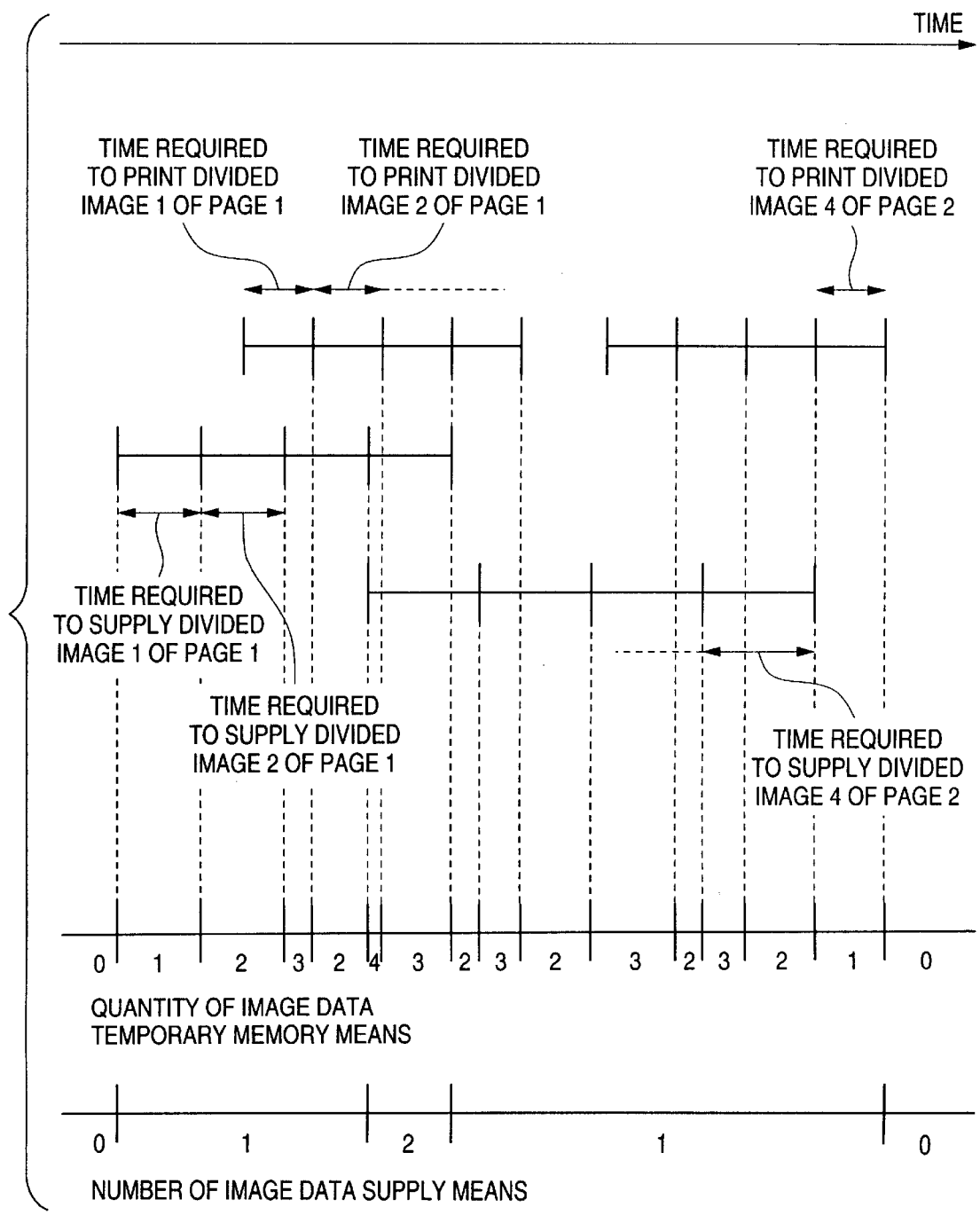
FIG. 12 is a time chart showing a relationship between the capacity of image data temporary memory means, the number of image data supply means and the process of divided image data.
Figure 13:
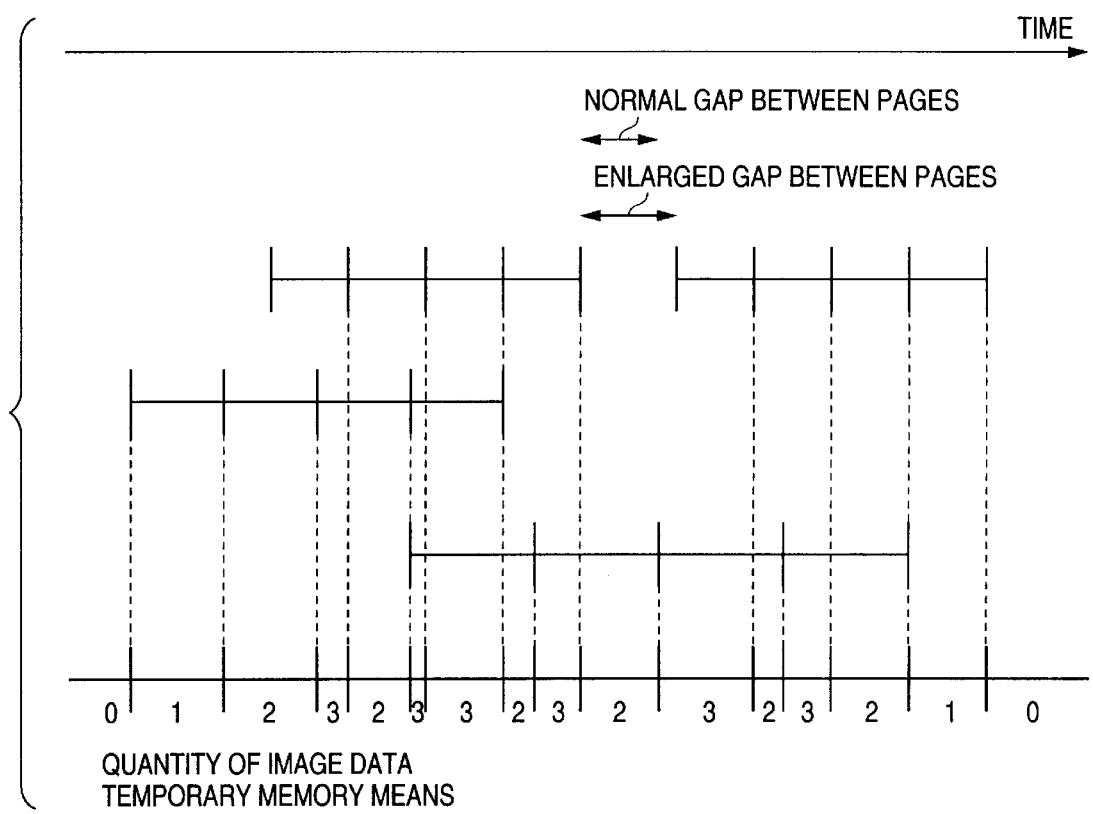
FIG. 13 is a time chart showing a relationship between the capacity of image data temporary memory means and the process of divided image data.
Figure 14:
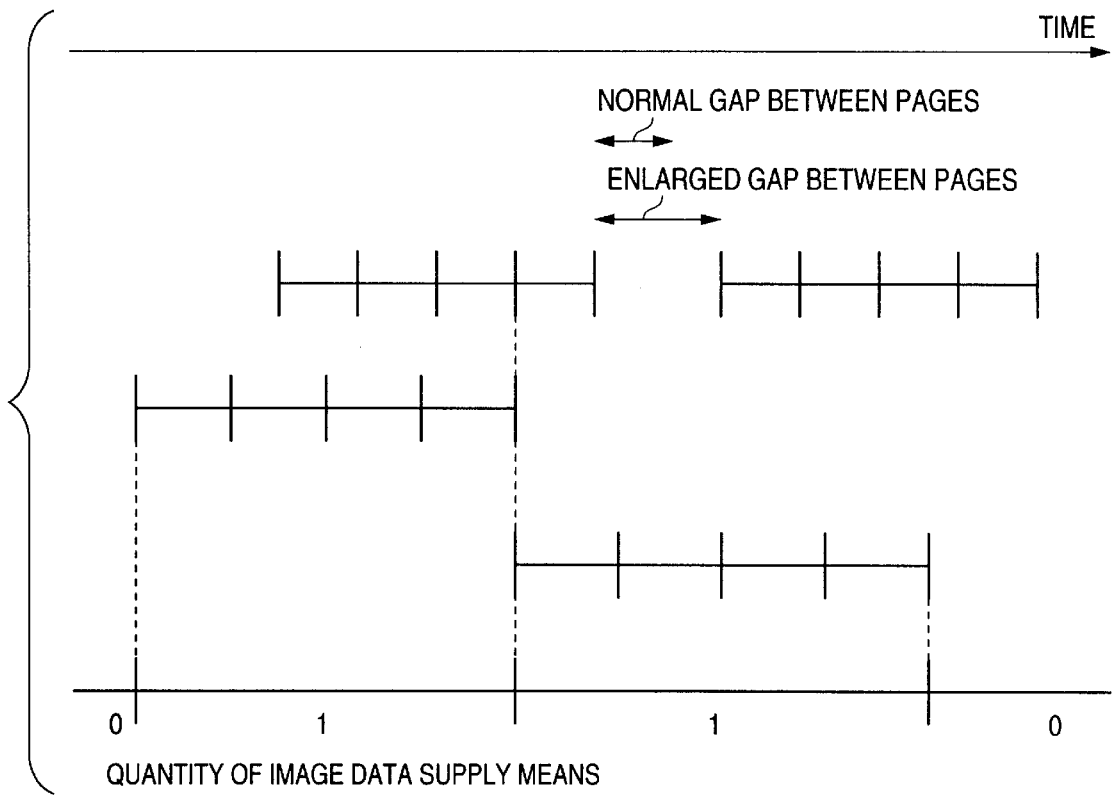
FIG. 14 is a time chart showing a relationship between the number of image data supply means and the process of divided image data.

FIGS. 12 to 14 show the procedures for the processing of the divided image data supply in the above-described embodiments. In the image forming apparatus, there is additionally provided with feed paper control means which delays a feed paper timing of sheets by the feed paper device 11 to delay the print start time by the print means in the state where divided image data to be printed are not yet stored in the image data temporary memory means.

FIG. 12 shows a state of the print time and the supply time of divided image data in the monochromatic print operation in which one page is divided into four divided image data to continuously print a plurality of pages. In the print processing, the print processing timing between the pages is vacant for a predetermined period of time, and at the time of print processing, the pages are continuously printed at fixed intervals, and the divided image data are continuously printed within the page.

In order to print the partial images on the basis of the divided image data, it is necessary that corresponding divided image data should have been supplied into the image data temporary memory means before starting the printing of the divided images. Because of this, when one divided image is printed, image data temporary memory means for one divided image portion is necessary, and in order to supply a next divided image, image data temporary memory means for one divided image portion is further necessary.

For example, when the maximum capacity of the image data temporary memory means is set for three divided images, in the example shown in FIG. 12, there arises the case where the capacity of the image data temporary memory means for four divided images is necessary, resulting in an occurrence of a state where the continuous print processing by the print means is disabled.

In view of the above, the feed paper timing of sheets with respect to the next page is delayed by the feed paper control means so that as shown in FIG. 13, the print processing timing between the previous page and the next page is made vacant for a predetermined time or more. That is, since the print processing timing with respect to the next page is delayed by making large a gap between pages, a lapping amount between the divided image data to be held in the image data temporary memory means with respect to the previous page and the divided image data to be held in the image data temporary memory means with respect to the next page reduces, and the maximum value of the capacity demanded by the image data temporary memory means is reduced to 3 to enable the continuous print processing by the print means.

When the maximum number of the image data supply means is set to 1, in the example shown in FIG. 12, there arises the case where two image data supply means are necessary, resulting in an occurrence of a state where the continuous print processing by the print means is disabled.

In view of the above, the feed paper timing of sheets with respect to the next page is delayed by the feed paper control means so that as shown in FIG. 14, the print processing timing between the previous page and the next page is made vacant for a predetermined time or more. That is, since the print processing timing with respect to the next page is delayed by making large a gap between pages, the maximum number of the image data supply means required is 1 to enable the continuous print processing by the print means.

Next, the procedure for obtaining the supply start time of the divided image data in the image data supply control means and the procedure for calculating a gap between pages in the feed paper control means will be described in detail hereinafter.

Figure 15:
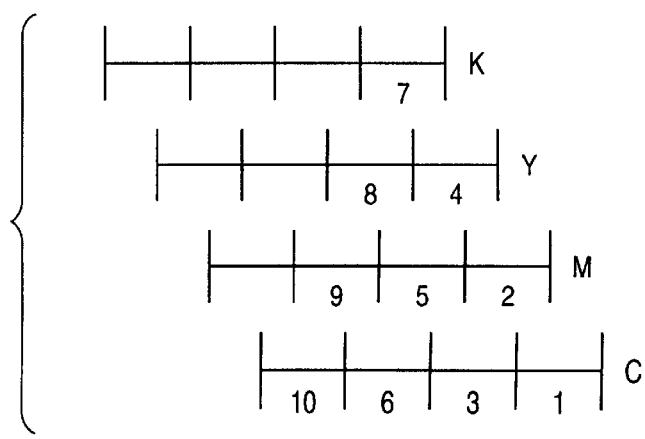
FIG. 15 is an explanatory view showing the print process order of divided image data for color components.

First, in the ensuing description, it is assumed that with respect to the last color component of the last divided image data of the last page, the termination time of the print processing is taken at the starting point "0," the time to the start time of the print processing is computed retracing the time, and the time is quantized into an integer time for handling. In the case where a plurality (four in this example) of color divided image data are printed, the print processing with respect to, the divided images is carried out in order of black (K), yellow (Y), magenta (M) and cyan (C), as shown in FIG. 15, and in the case of retracing the time, the decoding processing (supply processing) is carried out in order of numbers shown in the figure by the image data supply means. In the ensuing description, computation is carried out in order of numbers shown in FIG. 15, printing starts at time n and printing terminates at time "0." While the n is actually negative time, it is positive time for the convenience' sake of computation.

In order to obtain the decoding processing start time of color component of divided image data by increasing the time from "0," the following processings (1) to (3) are carried out.

(1) Time n=0.

(2) When time n=m, the following processing is carried out.

In the case where m is the print termination time with respect to the divided image data of a certain color component, 1 is added to the data storage amount of the image data temporary memory means.

In the case where m is the print start time with respect to the divided image data of a certain color component, it is added to the waiting queue of the decoding process by the image data supply and processing means. In the case where the "wait" is already present in the decoding waiting queue, the following processing is carried out. If the data storage amount of the image data temporary memory means is less than the maximum value and the image data supply means (decoder) is vacant, the decoding starts so as to terminate the decoding processing at the time m. In the case where a plurality of "wait"s are present, the shortest decoding time is selected.

In the case where m is the decoding start time with respect to the divided image data of a certain color component, the data storage amount of the image data temporary memory means is reduced by 1.

If the data storage amount of the image data temporary memory means exceeds the maximum value at the time of m, the print termination time of that page is increased by one page portion and returned to the time (n=m') of the print termination of the divided image data of the final color component of the page, and processing (2) is repeated with n=m'. If the data storage amount exceeds the maximum value even an increase of one page portion, one page is further increased, the processing (2) is repeated with n=m'. Even if the page spacing is sufficiently vacant, the data storage amount exceeds the maximum value, in which case, it is a jam.

(3) Increase n by 1 and processing (2) is repeated.

The above-described procedure will be described in further detail with reference to FIGS. 16 and 17.

Figure 16:
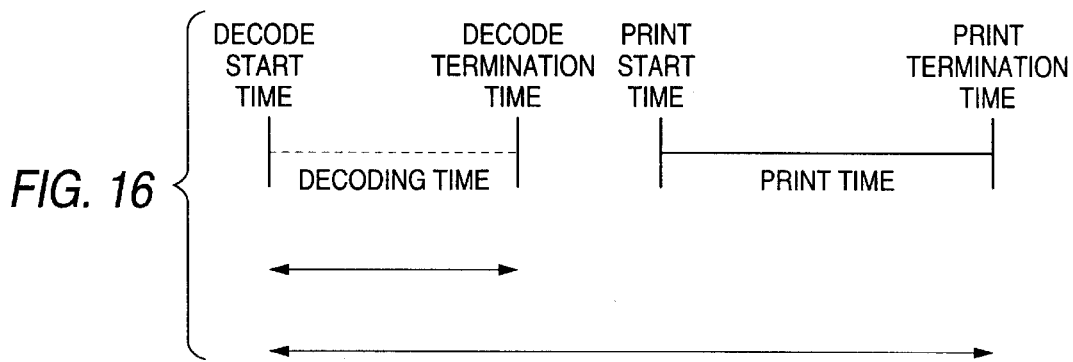
FIG. 16 is an explanatory view showing a relationship between the decoding time and the print time.

As shown in FIG. 16, the divided image data of color components are printed after being decoded. A decoder (image data supply means) is necessary from the decoding start time to the decoding terminal time. The capacity for a portion for storing divided image data for one color component is necessary for the image data temporary memory means from the decoding start time to the print termination time.

This procedure is to obtain the decoding time with respect to the divided image data of color components in the case where the number of decoders (image data supply means) and the capacity of the image data temporary memory means are limited.

Figure 17:
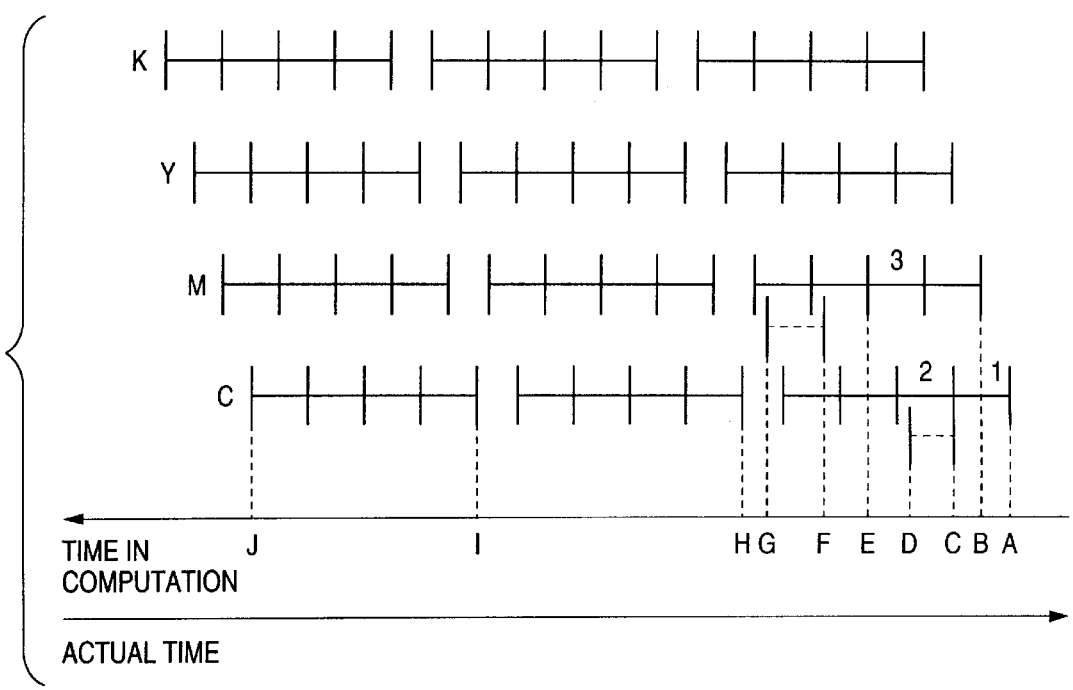
FIG. 17 is a time chart showing the print process order of divided image data for color components.
Figure 20:
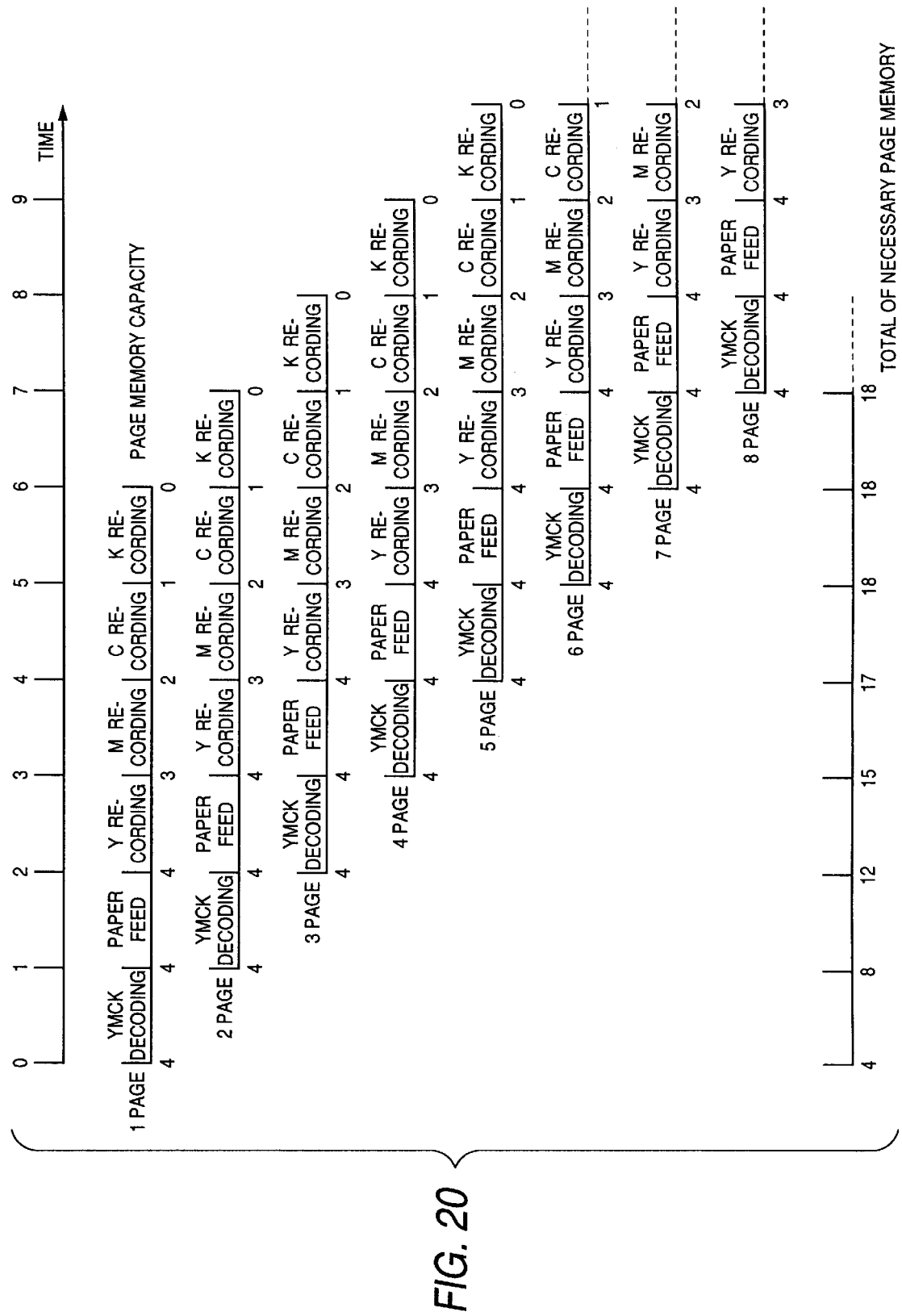
FIG. 20 is a time chart showing the print process of color image data in prior art.

First, the capacity of the image data temporary memory means is set to "0," and the time A shown in FIG. 17 is set to the time n=0. Thereafter, n is increased from "0,"and the capacity of the image data temporary memory means necessary for each time is computed.

In the case at each time, the print termination time of the divided image data of color components is the decoding start time, the capacity is increased and decreased. When the capacity increases at a certain time, with respect to the capacity at the later time, the increased capacity is continuously used as it is unless it is clearly decreased.

When n="0," the printing of color component cyan (C) terminates. Therefore, when the time is larger than "0," the capacity of the divided image data portion for one color component is necessary, and thus, 1 is added to the capacity.

Further, when n is at point B, the printing of color component magenta (M) terminates. Therefore, 1 is added to the capacity similar to the time of n="0."

Further, when n is at a point C, the printing with respect to the last divided image data of the color component cyan (C) (a portion "1" in FIG. 17) is started. If at this time, if the decoder (image data supply means) is left, the time for starting the decoding so that the decoding is terminated at the point C is determined. In this case, if the decoding starts at a point D, it terminates at the point C, in which case, the point D is the decoding start time.

Since the point C is also the printing termination time with respect to the divided image data (a portion of "2" in FIG. 17) two before the last color component cyan (C). Thus, at the point C, 1 is added to the capacity. Also at the time of printing termination of the other divided image data of color components, 1 is likewise added to the capacity.

Also when n is at a point D, the decoding is started. Thus, the capacity is reduced by 1. Similar processing is carried out also for the decoding start time of the divided image data of color components. For example, in the case where a decoder is not left at the printing start time point E of the divided image data two before the last color component magenta (M) (a portion "3" in FIG. 17), it is necessary to delay the decoding termination time till the time (point F) at which a decoder is left. In this case, therefore, the decoding start point is a point G.

Next, the predication method in the above-described supply time prediction means will be described.

For example, in the JPEG system of ITU-T standard, there exists a constant relationship between the code quantity and the decoding time. This relationship is described on a look-up table of the prediction means 5. The quantity of codes of image data stored in the image memory means 3 is measured whereby the decoding time by the image data supply means 4 can be predicted from the quantity of codes.

Further, for example, in the JPEG system of ITU-T standard, there exists a constant relationship between the coding time and the decoding time. This relationship is described on a look-up table of the prediction means 5. The coding time by the coding means of the image memory means 3 is measured whereby the decoding time by the image data supply means 4 can be predicted from the decoding time.

Furthermore, for example, in the JPEG system of ITU-T standard, there exists a constant relationship between the coded symbol of the Haffman coding and the decoding time. This relationship is described on a look-up table of the prediction means 5. The number of coded symbol stored in the image memory means 3 is measured whereby the decoding time by the image data supply means 4 can be predicted from the number of coded symbols.

Alternatively, instead of obtaining the decoding time by the image data supply means 4 by way of the predication as described above, in the prediction means 5, the coded divided image data is once decoded by the image data supply means 4, and the decoding time at that time is measured whereby the decoding time by the thereafter image data supply means may be predicted.

What is claimed is:

1. An image forming apparatus comprising:
    image division means for dividing an input image in parallel in a direction of a main scanning line;
    image data memory means for storing divided image data;
    image data supply means for supplying the divided image data from the image data memory means;
    image data temporary memory means for temporarily holding the supplied divided image data;
    print means for performing printing on a sheet of paper on the basis of the divided image data stored in the image data memory means;
    prediction mean for predicting a supplying and processing time by the image data supply means; and
    image data supply control means for causing the image data supply means to start the supplying and processing of the divided image data at a time preceding a print processing start time by the print means according to said supplying and processing time predicted.

2. An image processing apparatus according to claim 1, further comprising image data preprocessing means for processing said divided image data preceding the storage of said divided image data to said image data memory means, said prediction means predicting the supplying and processing time by said image data supply means on the basis of a processed result of said divided image data by said image data preprocessing means.

3. An image processing apparatus according to claim 1, further comprising feed paper control means for delaying feed paper timing of sheets when the divided image data to be printed is not yet stored in the image data temporary memory means, to delay the print processing start time of the print means.

4. An image processing apparatus according to claim 1, wherein the prediction means obtains a supply time of the divided image data by retracing a time from a print processing start time of a last divided image data of a page to be printed by the print means retroactively toward a first divided image data prior to the final printing process, and
    the image data supply control means computes a number of image data supply means and a quantity of image data temporary memory means to determine a printing possibility in the print means, and when the printing is impossible, a printing start time by the print means for a particular divided image data is delayed to enable the printing.

5. An image processing apparatus according to claim 1, wherein the image data memory means comprises coding of the means for information-source coding image data and coded data memory means for storing the coded image, data,
    the image data supply means comprises image decoding means for decoding the coded image data, and
    the prediction means comprises means for predicting or measuring a decoding time of the divided coded image data,
    the image data being coded and stored, and decoded when said divided image data is supplied.

6. An image processing apparatus according to claim 5, wherein the prediction means predicts the decoding time on a basis of a quantity of codes of the divided image data.

7. An image processing apparatus according to claim 5, wherein the prediction means predicts the decoding time on a basis of a processing time by the coding means.

8. An image processing apparatus according to claim 5, wherein the prediction means predicts the decoding time on a basis of a number of coded symbols of the divided image data.

9. An image processing apparatus according to claim 5, wherein the prediction means predicts the decoding time obtained by performing a pre-decoding process by means of the image decoding means.

10. An image forming apparatus comprising:
    image division means for dividing an input color image in parallel in a direction of a main scanning line;
    image data memory means for storing divided image data;
    image data supply means for supplying the divided image data from the image data memory means;
    image data temporary memory means for temporarily holding the supplied divided image data;
    print means comprising a plurality of units representing color components for placing color inks corresponding to the respective color components of the divided image data one upon another on the basis of the divided image data stored in the image data temporary memory means and recording the color divided image;
    prediction mean for predicting a supplying and processing time by the image data supply means; and
    image data supply control means for causing the image data supply means to start the supplying and processing of the divided image data of color components at a time preceding a print processing start time by the units according to said predicted supplying and processing time.

11. An image processing apparatus according to claim 10, further comprising image data preprocessing means for processing said divided image data preceding the storage of said divided image data to said image data memory means, said prediction means predicting the supplying and processing time by said image data supply means on the basis of the processed result of said divided image data by said image data preprocessing means.

12. An image processing apparatus according to claim 10, further comprising feed paper control means for delaying feed paper timing of sheets when the divided image data to be printed is not yet stored in the image data temporary memory means to delay the print processing start time of the print means.

13. An image processing apparatus according to claim 10, wherein the prediction means obtains a supply start time of the divided image data by retracing a time from a print start time of a last divided image data of a page to be printed by the print means retroactively toward a first divided image data prior to a final printing process by the print means, and the image data supply control means computes a number of image data supply means and a quantity of image data temporary memory means to determine a printing possibility in the print means, and when the printing is impossible, the printing start time by the print means is delayed to enable the printing.

14. An image processing apparatus according to claim 10, wherein the prediction means obtains a supply start time of the divided image data of color components by retracing a time from a print start time of a last divided image data of a color component of a page to be printed by the print means retroactively toward a first divided image data prior to the final printing process, and the image data supply control means computes a number of image data supply means and a quantity of image data temporary memory means to determine a printing possibility in the print means, and when the printing is impossible, the printing start time by the print means is delayed to enable the printing.

15. An image processing apparatus according to claim 10, wherein the image data memory means comprises coding means for information-source coding of the image data and coded data memory means for storing the coded image data, the image data supply means comprises image decoding means for decoding the coded image data, and the prediction means comprises means for predicting or measuring the decoding time of the divided coded image data, wherein the image data is coded and stored, and decoded when said divided image data is supplied.

16. An image processing apparatus according to claim 15, wherein the prediction means predicts the decoding time on a basis of the quantity of codes of the divided image data.

17. An image processing apparatus according to claim 15, wherein the prediction means predicts the decoding time on a basis of a processing time by the coding means.

18. An image processing apparatus according to claim 15, wherein the prediction means predicts the decoding time on a basis of a number of coded symbols of the divided image data.

19. An image processing apparatus according to claim 15, wherein the prediction means predicts the decoding time obtained by performing a pre-decoding process by means of the image decoding means.

20. An image forming apparatus comprising:

image division means for dividing an input image in parallel in a direction of a main scanning line;

image data memory means for storing divided image data;

a plurality of image data supply means for supplying individual divided image data from the image data memory means independently of other divided image data;

image data supply selection means for selecting one of said plurality of image data supply means for supplying the divided image data from said image data memory means;

image data temporary memory means for temporarily holding the supplied divided image data;

image data temporary memory address selection means for determining an area address within the image data temporary memory means for storing the divided image data;

print means for performing printing on a sheet of paper on the basis of the divided image data stored in the image data memory means;

prediction mean for predicting a supplying and processing time by the image data supply means; and image data supply and control means for causing each image data supply means to start the supplying and processing of the divided image data from a time preceding the print processing start time by the print means according to said supplying and processing time predicted.

21. An image processing apparatus according to claim 20, further comprising feed paper control means for delaying feed paper timing of sheets when the divided image data to be printed is not yet stored in the image data temporary memory means, to thereby delay the print start time of the print means.

22. An image processing apparatus according to claim 20, wherein the prediction means obtains a supply start time of the divided image data by retracing a time from a print start time of a last divided image data of a page to be printed by the print means retroactively toward a first divided image data prior to the final printing process, and the image data supply control means computes a number of image data supply means and a quantity of image data temporary memory means to determine a printing possibility in the print means, and when the printing is impossible, the printing start time by the print means is delayed to enable the printing.

23. An image forming apparatus comprising:

image division means for dividing an input color image in parallel in a direction of a main scanning line;

image data memory means for storing divided image data;

a plurality of image data supply means for supplying individual divided image data from the image data memory means independently of other divided image data;

image data supply selection means for selecting one of said plurality of image data supply means for supplying the divided image data from said image data memory means;

image data temporary memory means for temporarily holding the supplied divided image data;

image data temporary memory address selection means for determining an area address within the image data temporary memory means for storing the divided image data;

print means comprising a plurality of units representing color components for placing color inks corresponding to the respective color component of the divided image data one upon another on the basis of the divided image data stored in the image data temporary memory means and recording the color divided image;

print selection means for supplying or selecting the divided image data output from the image data memory means to any any of the print means units; and prediction mean for predicting a supplying and processing time by the respective image data supply means; and image data supply control means for causing each image data supply means to start a supply of divided image data of color components from a time preceding the print processing start time by the units according to said predicted supplying and processing time.

24. An image processing apparatus according to claim 23, further comprising feed paper control means for delaying feed paper timing of sheets, when the divided image data to be printed is not yet stored in the image data temporary memory means to delay a print start time of the print means.

25. An image processing apparatus according to claim 23, wherein the prediction means obtains a supply start time of the divided image data by retracing a time from a print start time of a last divided image data of a page to be printed by the print means retroactively toward a first divided image data prior to the final printing process, and the image data supply control means computes a number of image data supply means and a quantity of image data temporary memory means to determine a printing possibility in the print means, and when the printing is impossible, printing start time by the print means is delayed to enable the printing.

26. An image processing apparatus according to claim 23, wherein the prediction means obtains a supply start time of the divided image data of color components by retracing a time from a print start time of a last divided image data of a color component of a page to be printed by the print means retroactively toward a first divided image data prior to the final printing process, and the image data supply control means computes a number of image data supply means and a quantity of image data temporary memory means to determine a printing possibility in the print means, and when the printing is impossible, the printing start time by the print means is delayed to enable the printing.

27. An image forming apparatus, comprising:

image division means for dividing an input image in parallel with a direction of a main scanning line into divided image data;

image data memory means for storing the divided image data;

a plurality of image data supply means for supplying individual divided image data from the image data memory means independently of other divided image data;

image data supply selection means for selecting one of the plurality of image data supply means used to supply the divided image data from said image data memory means;

a plurality of image data temporary memory means equal in number to the plurality of image data supply means for temporarily holding the supplied divided image data;

print means for performing printing on a sheet of paper on the basis of the divided image data stored in the image data memory means;

image data temporary memory selection means for selecting one of the plurality of image data temporary memory means used to supply divided image data to the print means;

prediction means for predicting a supply-and-processing time by the image data supply means based on the divided image data being stored in the image data memory means; and image data supply control means for causing the respective image data supply means to fixedly supplying the divided image data to the same image data temporary memory means from a time preceding a print processing start time by the print means according to said predicted supply-and-processing time.

28. An image processing apparatus according to claim 27, further comprising feed paper control means for delaying feed paper timing of sheets when the divided image data to be printed is not yet stored in the image data temporary memory means to delay the print start time of the print means.

29. An image processing apparatus according to claim 27, wherein the prediction means obtains a supply start time of the divided image data by retracing a time from a print start time of a last divided image data of a page to be printed by the print means retroactively toward a first divided image data prior to the final printing process, and the image data supply control means computes a number of image data supply means and a quantity of image data temporary memory means to determine a printing possibility in the print means, and when the printing is impossible, the printing start time by the print means is delayed to enable the printing.

30. An image forming apparatus comprising:

image division means for dividing an input color image in parallel in a direction of a main scanning line;

image data memory means for storing divided image data;

a plurality of image data supply means for supplying individual divided image data from the image data memory means independently of other divided image data;

image data supply selection means for selecting one of the plurality of image data supply means used to supply the divided image data from said image data memory means;

a plurality of image data temporary memory means equal in number to the plurality of image data supply means for temporarily holding the supplied divided image data;

print means comprising a plurality of units representing color components for performing printing by placing color inks corresponding to the respective color components of the divided image data one upon another based on the divided image data stored in the image data temporary memory means to record the divided color image;

image data temporary memory selection means for selecting one of the plurality of image data temporary memory means used to supply divided image data to the units of the print means;

print selection means for selecting to which unit of the print means an output from the image data temporary memory means is output;

prediction means for predicting a supplying and processing time by the image data supply means; and image data supply control means for causing the respective image data supply means to fixedly supply the divided image data of color components to the same image data temporary memory means at a time preceding the print processing start time by the units of the print means according to said predicted supplying and processing time.

31. An image processing apparatus according to claim 30, further comprising feed paper control means for delaying feed paper timing of sheets when the divided image data to be printed is not yet stored in the image data temporary memory means to delay the print start time of the print means.

32. An image processing apparatus according to claim 30, wherein the prediction means obtains a supply start time of the divided image data by retracing a time from a print start time of a last divided image data of a page to be printed by the print means retroactively toward a first divided image data prior to the final printing process and the image data supply control means computes a number of image data supply means and a quantity of image data temporary memory means to determine a printing possibility in the print means, and when the printing is impossible, the printing start time by the print means is delayed to enable the printing.

33. An image processing apparatus according to claim 30, wherein the prediction means obtains a supply start time of the divided image data of color components by retracing a time from a print start time of a last divided image data of color components of a page to be printed by the print means retroactively toward a first divided image data prior to the final printing process, and the image data supply control means computes a number of image data supply means and a quantity of image data temporary memory means to determine a printing possibility in the print means, and when the printing is impossible, the printing start time by the print means is delayed to enable the printing.

* * * * *